United States Patent [19]

Gessel

[11] Patent Number: 5,396,351
[45] Date of Patent: Mar. 7, 1995

[54] POLARIZING FIBER-OPTIC FACEPLATE OF STACKED ADHERED GLASS ELEMENTS IN A LIQUID CRYSTAL DISPLAY

[75] Inventor: David J. Gessel, San Francisco, Calif.

[73] Assignee: Apple Computer, Inc., Cupertino, Calif.

[21] Appl. No.: 811,789

[22] Filed: Dec. 20, 1991

[51] Int. Cl.6 .................. G02F 1/1335; G02F 1/1333; G02B 6/04; G02B 6/10
[52] U.S. Cl. ........................................ 359/42; 359/63; 359/82; 385/120; 385/131; 385/901
[58] Field of Search ............... 359/42, 63, 82; 385/11, 385/120, 130, 131, 901

[56] References Cited

U.S. PATENT DOCUMENTS

| | | | |
|---|---|---|---|
| 4,241,984 | 12/1980 | Leibowitz | 359/63 |
| 4,486,760 | 12/1984 | Funada et al. | 359/42 |
| 4,593,977 | 6/1986 | Takamatsu et al. | 359/68 |
| 4,743,099 | 5/1988 | Dickerson et al. | 359/68 |
| 5,181,130 | 1/1993 | Hubby, Jr. | 359/42 |
| 5,221,978 | 6/1993 | Heynderickx et al. | 359/53 |
| 5,250,214 | 10/1993 | Karemoto et al. | 359/63 |
| 5,260,815 | 11/1993 | Takizawa | 359/42 |
| 5,329,388 | 7/1994 | Yoshimizu | 359/42 |

Primary Examiner—Anita Pellman Gross
Attorney, Agent, or Firm—Blakely, Sokoloff, Taylor & Zafman

[57] ABSTRACT

A polarizing fiber-optic layer for use within a liquid crystal multilayer structure, particularly for use in a computer system having a liquid crystal display screen. The invention relates to a specially designed thin polarizing fiber-optic layer which functions both as a polarizer of light in a specific direction and as a fiber-optic material for optically resolving an image to its surface from a position optically below the fiber-optic material layer. Using this double functioning material the problems of off axis viewing, contrast (and color) distortion and parallax can be solved in flat panel displays. This inventive layer replaces several complex layers of a conventional liquid crystal display thereby greatly simplifying display manufacture and improving performance.

30 Claims, 10 Drawing Sheets

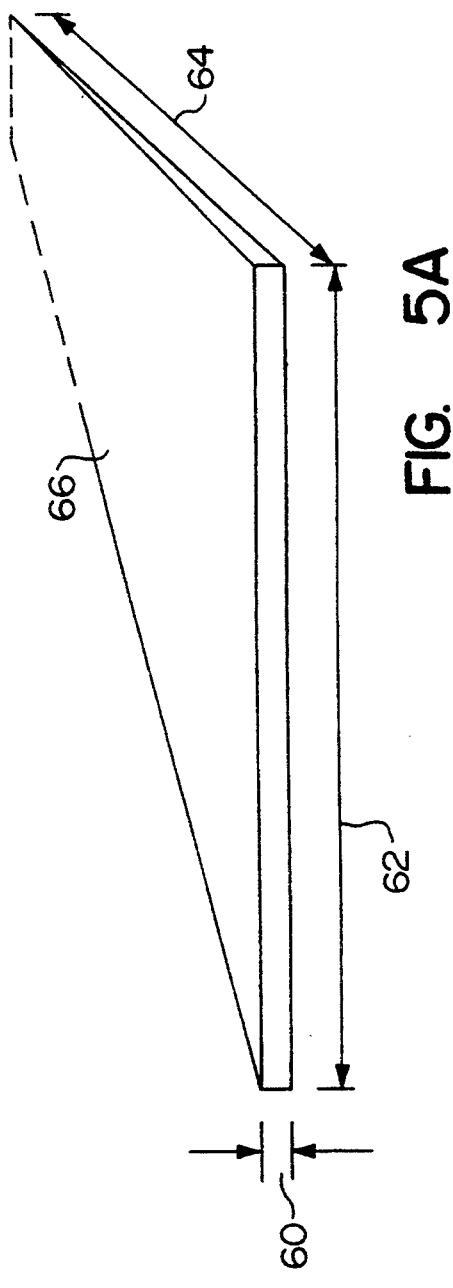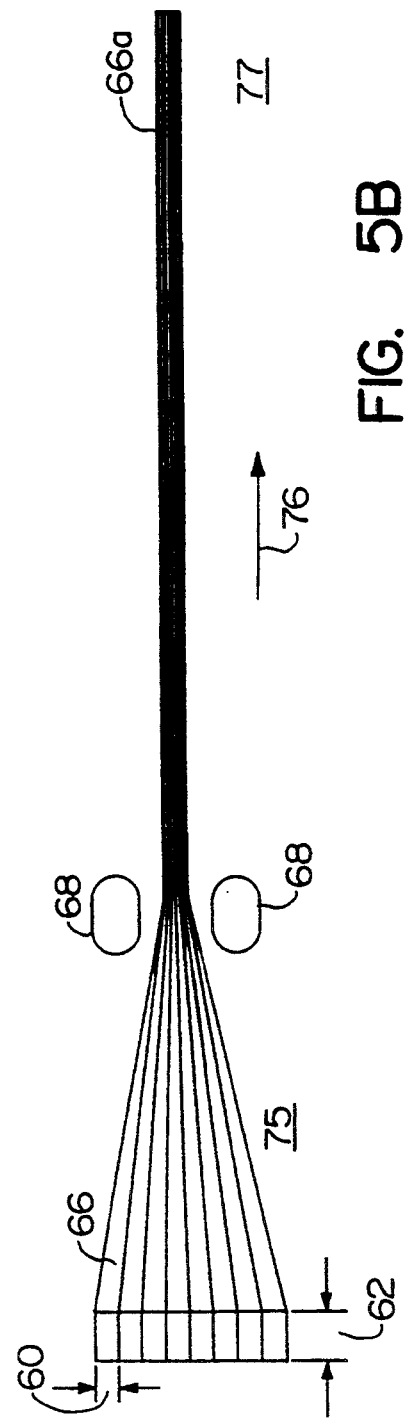

POLARIZING FIBER-OPTIC FACEPLATE OF STACKED ADHERED GLASS ELEMENTS IN A LIQUID CRYSTAL DISPLAY

BACKGROUND OF THE INVENTION (1) Field of the Invention

The present invention relates to the field of flat panel screen displays which are currently used as a replacement to electrode ray tube technology for display purposes and most particularly in the area of portable computers.

(2) Prior Art

Flat panel screen displays are designed to display information and/or images on a screen. They have been extensively used in conjunction with computer systems to act as computer display screens. Instead of using the large and heavy cathode ray tube technology, many flat panel displays utilize Liquid Crystal Display (LCD) technology. LC flat panel displays are relatively light weight and have low power consumption. Therefore, the LC flat panel display screen is ideal for use with portable computers where light weight and low power consumption materials are desired.

However, conventional flat panel LC displays have several problems and drawbacks which stem from their structural design. For instance, images formed on the screen within a conventional LCD must be viewed straight on by the computer user by facing the screen directly, see FIG. 1 direction 38 or otherwise known as a 90 degree view angle. When viewing the flat panel screen tilted or from a vertical or horizontal angle, called "off axis" viewing (as shown by direction 39), conventional LCD screens create display distortions because of the optical nature of the display technology. Most often this off axis viewing leads to contrast degradation and color aberrations. Contrast aberrations in black and white and gray scale displays are manifest in color displays as color aberrations. Both are caused by the angular dependency of contrast in LCDs. On some conventional flat panel LC displays the contrast may distort enough to invert the image at some off axis viewing angles where black pixels becomes white and vice-versa. If the LC display contains colors, then off axis viewing will create color aberrations as well as contrast problems. These contrast and color aberrations are caused in part because the image of conventional LCD screens forms within an LC layer, below the screen surface. In the past, LCD flat panel display structures have not been able to adequately and cost effectively resolve these problems. As a result, it would be beneficial to cost effectively reduce or remove the off axis viewing problems associated with conventional flat panel LC displays. The present invention offers such a solution.

Another problem with conventional LC displays is parallax which is related to off axis viewing. Parallax is only a problem with touch screens because of the construction of flat panel LC displays; because of the construction of flat panel LC displays, the image that appears to the user's eye is not at the true tangible screen surface position. The difference between the image's observable position and the surface of the screen is called parallax. If a touch screen computer system is used with this type of LC display then it will be difficult to accurately select various on screen items because of this parallax problem. Further, parallax increases with increasing off-axis viewing angle. The image appears to the user's eye to float in the LC layer itself, and this is the parallax problem. The image does not appear to be at the surface of the display and so when such a display is used in a touch screen arrangement the user is required to touch the surface of the display with the expectation that the surface coordinates correlate to the coordinates of the pixels visible within the display. Parallax results when the angle of view is such that the apparent image is not visibly oriented directly under the corresponding point on the surface of the display (refer to FIG. 2C). The illustration shows a target pixel 212 in the LC layer 205 and a corresponding target point 214 on the surface of the touch screen or top glass 203. The view location 201 is at an angle to the normal of the display, and so the intersection of the line of sight 202 (between the observer location and the target pixel) and the top glass is a point some distance from the target point. The distance between the line of the sight/top glass intersection 210 and the target point 214 is the parallax 220 associated with the particular display and particular viewing angle. The parallax is zero for an observer viewing the target pixel "head-on", i.e. such that the line of sight is normal (perpendicular) to the display surface. The invention solves this problem by transmitting the image of the pixel to the surface of the display such that the target point 214 and the apparent image of the pixel 210 are the same. Therefore, it is desired to eliminate the parallax problem with LC displays. The preferred embodiment of the present invention offers such a solution.

Multilayer designs, also called structures, present another problem faced by prior art LCDs. Conventional LC displays are composed of very complex multilayers and require several different and technologically complicated fabrication steps for each layer. The resultant LC display is therefore relatively expensive. The description of these layers of a prior art LC display will be described in detail further below. It would be very beneficial to be able combine one or more of the associated layers of a conventional LC display in order to reduce the fabrication steps, and thereby reduce costs, of the resultant flat panel display. The present invention provides a solution. In prior art designs, LC displays utilizing fiber-optic material layers to reduce parallax and other off axis viewing disorders are relatively expensive because the fiber optic layers were overlaid over, as an after thought, the prior art multi-layer structures of LC displays which is described below. The present invention offers a unique apparatus viably reducing the cost of manufacture of LC displays.

The operation and structure of a prior art flat panel LC display will now be described. Although the structural composition and operation of a conventional LCD device is well known in the prior art, a brief description of the prior art LCD device is presented herewith because it offers a better understanding of the present invention. FIG. 1 illustrates a cross sectional view of a conventional multilayered LC display structure 24. The display structure is multilayered and forms the screen upon which images will be viewed. Image formation occurs within a liquid crystal ("LC") layer 16. However, the image is a result of an optical interaction between several layers including the LC layer. A computer system 9, or other control unit, interfaces with the LC screen through electronic connections 3 to control the creation of images and data thereon. A portion of the structure of the LC screen has been removed so that certain layers are exposed for description. The straight on angle of view for this screen is illustrated by direction 38 and FIG. 1 shows the screen portion from its side cross section view.

The LC display of FIG. 1 includes a light source 8 which provides backlighting. Not all displays have backlighting or are illuminated from the back. In fact many LC displays on the market, such as those in calculators are not backlight. Those in watches generally have some mechanism for activating a backlight, such as a button, when the backlight is necessary to see the image such as when it is dark. Backlights in general improve contrast and viewability of a display, they do, however, draw far more power than the display itself.

A conventional LC display operates as follows. A standard, unpolarized light source 8 emits output light radiation 15 from behind the screen plane to substantially irradiate the entire screen back plane or the back plane may be irradiated by reflecting light incident on the display from the viewer's environment or some combination (e.g. reflective lighting and light source) thereof. Light rays traverse through a first polarizer layer 10 (approximately 1.5 mm thick) which polarizes the incident light rays in a first arbitrary direction 73. This direction is referred to as the zero (0) degree polarization direction. The light next travels though a glass structure layer 12 (approximately 1.1 mm thick) which is transparent and does not effect the polarization character of the first polarized light. The glass layer 12 is used mainly to provide mechanical support for the LCD structure which rests above. The glass structure layer 12 and the first polarizer layer 10 are mechanically secured together.

What is described is a conventional TFT active matrix LCD (TFT stands for Thin Film Transistor). More prevalent in many applications, such as pocket calculators and many lower cost LCD computer displays, is the directly addressed, or nematic, displays such as Sharp's "Super Twist" and "Double Super Twist" displays. The invention is equally applicable to such displays. The major difference between active and passive displays are that passive displays do not have a transistor associated with and located with each pixel of the display. The resultant simplification of the manufacturing process makes passive displays much less expensive to produce. However, the TFT solves many problems encountered when attempting to control a large matrix of pixels as one might encounter in a computer display (where typically one finds 640×400 or more pixels compared to a calculator which might have 60 or 70 total pixel elements), and so TFT displays generally exhibit much higher quality images with better contrast. It is extremely difficult to control a passive matrix display with the accuracy required to create a gray scale image, where each pixel might demonstrate any one of 2 to 256 different levels of contrast, therefore most gray scale and most color displays are active matrix displays. Contrast aberrations associated with off axis viewing are particularly problematic in passively addressed displays; this invention would dramatically improve the viewability of passive matrix displays and would therefore allow their use in a much wider range of products where before they could not be selected because of poor viewability, even considering their significantly lower cost.

Referring still to FIG. 1, the polarized light traverses through an active transistor and output electrode matrix layer 14 (about 50 nm thick) and the LC layer 16 which contains MCLC 133 or 2,3-dicyano phenyl from Merck (approximately 4–10 microns thick) and, which provides the control and structure required to form images. All images created by this flat panel LCD are composed of pixels, or "dots." Each pixel has at least one corresponding transistor and corresponding electrode from the control layer 14. In other words, each transistor is responsible for creating a viewable "pixel" on the viewing screen. A number of localized active transistors may thus create an image. Each transistor is opaque. The ratio of the area of the transistors and the associated connections to the area of the associated electrode is a major factor in the brightness of the display. The transistors are shown in the cut away cross section of layer 14 and are illustrated by the dark dots 32 at each intersection line. The lines represent the control lines for the transistors; the source lines are illustrated by lines 36 running vertically and the gate lines are illustrated by lines 34 running horizontally. To activate a particular transistor 32, its identifying gate lines 34 and source lines 36 are activated. Each transistor 32 also has a corresponding output electrode 30 associated with it and attached to the transistor drain. The output electrodes are insulated from the common electrode 18 by the high dielectric properties of the LC layer, 16; they therefore act as capacitors. The output electrodes 30 are also transparent and will charge up upon transistor activation to create an electric field. Not all of the output electrodes are shown for simplification. Only a few electrodes 30 are shown and shaded, however, it is appreciated that each transistor has its own output electrode. A holding capacitor, not shown, may be fabricated along with the TFT to maintain this charged state longer than the capacitance of the output electrode alone. The characteristic discharge time is the time it takes for the charge on the output electrode to decay enough that the contrast of the corresponding pixel is impaired. The charge on the output electrode must be refreshed before this decay is visible or the display will appear to "flicker". The output electrodes 30 are made of an indium tin oxide and are conductors while maintaining their transparent properties.

If the computer 9 or control unit identifies a particular transistor 32 and activates such, the corresponding output electrode is thereby charged and creates a localized charge between the electrode plate 30, and the common electrode 18. This charge will effect the liquid crystal layer 16 as will be described below.

Referring to FIG. 1, the first polarized light polarized by the polarizer 10 and after passing through the control layer 14, next passes through the liquid crystal layer 16 (approximately 4–10 μm thick). This is a layer of liquid crystal material such as Merck MCLC 133. The liquid is secured on the sides of the layer structure by an epoxy or other material, not shown, to prevent it from flowing out from the sides. The spacing of the layer is maintained by small glass beads or fibers of diameter equal to the thickness of the layer. The horizontal spacing of the beads or fibers is sparse enough to insure that the optical properties of the display are not compromised while insuring the mechanical stability of the structure. Below the liquid crystal layer 16 (shown as 44 in FIG. 1) lacquer is applied to the control layer and rubbed with velvet to create very fine parallel markings in an arbitrary but unidirectional fashion. Above the liquid crystal layer 16 a lacquer 46 is also applied and also rubbed with velvet to create similar fine parallel markings which are perpendicular to the markings on side 44. In the absence of any electric field in the LC layer, these markings will be used to mechanically hold the LC molecules in place. Within the LC layer 16, light rays are either free to pass through unchanged or their polarization direction is rotated 90 degrees, depending on the arrangement of the crystal molecule formation in a manner described below.

Light passes, either changed or unchanged, through the liquid crystal layer 16 to the next layer which is the common electrode layer 18 (approximately 50–60 nm thick). This layer creates a reference voltage for use with each of the independent output electrodes 30 so that an electric field may be produced there between. This common electrode is also transparent and made of a similar material as that of the output electrode 30. The liquid crystal layer 16 is mechanically coupled to, and sandwiched between, both the control layer 14 and the common electrode layer 18. The interaction between these layers will be described later. In color flat panel LC displays, thin film color filters 40 are placed between the common electrode layer 18 and the top glass layer 20. The color filter layer (2 $\mu$m thick), 40, allows the development of color images on the display screen. On top of, and mechanically coupled to, the color filter layer 40 is another glass support layer 20 (approximately 1.1–3.0 mm thick but this thickness depends on size and use of LCD). This layer is transparent and also helps to support the LC display from mechanical shock and breakage.

Referring still to FIG. 1, the glass layer 20 is coupled to a second polarizing layer 22 (approximately 1.5 mm thick) which is called the analyzer 22. The analyzer layer 22 polarizes light in a direction 72 perpendicular to that of the direction 73 of the first polarizer 10. Therefore, if the light is not altered in some way, once it becomes polarized in one direction by the first polarizer 10, it will not pass through the analyzer layer since orthogonal polarization completely blocks out the light rays. No light will be seen from view angle 38 and a resultant dark spot forms in the display.

The operation and structure of the LC layer has been hypothesized and is well used in practice in the prior art and described as follows for a clear understanding of the present invention. The first polarized light rays are altered in the liquid crystal layer 16 as a result of the alignment of the liquid crystal molecules 50 as shown in FIG. 2. FIG. 2 illustrates the interaction of the transistor and output electrode control layer 14, the LC layer 16, and the common electrode layer 18. The liquid crystal molecules are shown in FIG. 2(A) in their suspension state when no electric field is present. The long molecules 50 naturally settle into the finely etched groves 44 of the bottom of the LC layer 16. Due to a particular natural arrangement phenomena, not entirely understood by science, the molecules arrange themselves in a spiral staircase fashion 51. The stair case rises until the molecules settle into the upper etched groves 46 which run perpendicular to the lower groves 44. These grove patterns serve to mechanically anchor the spiral staircase molecules and initiate the formation of the staircase pattern.

Referring to prior art FIG. 2(B), application of an electric potential between the TFT and the common ground creates an electric field the direction of which is illustrated by 55. Upon application of an electric field 55 through the LC layer 16, the LC molecules are forced from their staircase arrangement into a vertical arrangement 53 as shown. The molecules line up along the electric field lines 55 from below to above. The unique bi-polar anisotropic optical/electrical behavior of the liquid crystal molecules (such as those supplied by Merck under the name MCLC 133) causes them to experience a torsional force as in interaction between their polar electrical structure and the applied electric field. This torque causes the molecules to rotate in such a way as to align the optical axis of the molecule vertically, as is illustrated by 53. The electric field 55 is generated by the charge interaction of the various output electrodes 30 and the common electrode layer 18 which surround the LC layer. The common electrode is continuous and generally connected to ground. It would be considered to be the minus (−) terminal of a simple DC electric circuit. The output electrode is charged positively or negatively or in an alternating manner with respect to the common electrode plane. When a positive charge settles on one of the output electrodes 30, it will set up a localized electric field through a localized portion of sandwiched LC layer to vertically align a portion of the LC crystals in the layer 16 that are bounded by the area of the charged electrode 30 and the common electrode layer 18. In this fashion, certain portions of the LC may be in staircase formation 51 (since no charge is on the underlying electrode in that portion) while other portions of the LC may be in vertical formation 53, depending on the charge status of each transistor 32 and its associated output electrode 30. When the potential between the TFT and the common electrode is brought to zero the molecules 50 will return to their staircase arrangement 51. It can be appreciated that liquid crystal molecules can be selected and placed in the proper environment wherein they arrange themselves in staircase formation upon application of an electric field and arrange themselves vertically when no field is present, just opposite to the description of the preferred embodiment herein. It would be obvious to make such a differentiation.

When the LC material has its molecules oriented in the staircase fashion 51 it is appreciated that this is a three dimensional structure, and that within each plane of molecules parallel to the layers of the sandwich structure all of the LC molecules have the same orientation. It should be appreciated that, for reasons beyond the scope of this document, each molecule of liquid crystal (such as Merck MCLC 133) is optically anisotropic in as much as it is transparent to light oscillating transverse to it's length and opaque to light oscillating parallel to its length. As a combination of this anisotropy and of the overall alignment of the liquid crystal in the staircase arrangement, each molecular layer of LC material acts as a polarizing layer, each layer polarizing light in a direction slightly rotated from the one above it. It is well known that polarizing layers partially rotated one from another are partially transparent through the sum of their polarizations, and that the net polarization of light passing through more than one polarizer is in the direction of the last polarizer through which it has passed. As light passes through each molecular layer of LC material arranged in the stair-step fashion, its polarization is rotated by some small angle. After passing through effective polarizers, each a single molecular layer thick, and each rotating the polarization of the light by $90/n°$, the light is rotated 90°, and has suffered nominal attenuation. It will then freely pass through the last polarizer.

As a result of the crystal molecule formation, polarized light traversing through the LC material, which has its molecules aligned in a staircase fashion 51, is optically rotated by the molecule formation. Light in the zero degree direction of polarization which passes through the staircase formation 51 becomes rotated by 90 degrees. And first polarized light passing through the vertical formation 53 remains unchanged in its zero degree direction of polarization.

As seen by prior art FIGS. 2(A) and 2(B), first polarized light that has been rotated by the crystal molecule staircase has been changed from the zero degree direction 73 to the 90 degree direction 72 of polarization. Therefore, the rotated polarized light rays will freely pass through the analyzer layer 22 which polarizes light to the 90 degree direction by restricting light in the zero degree direction. Thus, light passing through the LC layer having a staircase formation will eventually be seen by the viewer 38 as a "white pixel" on the display. And, first polarized light rays passing through the vertical arrangement of molecules 53 of layer 16 is not rotated and will be fully absorbed at the analyzer layer 22. Light passing through the vertical arrangement 53 will not been seen by the view 38 and will therefore represent a "black pixel" on the display. Thus, when the transistor electrode 30 is charged, molecules 50 located in line between the transistor electrode 30 and the common electrode are aligned vertical and a black pixel is formed on the display screen. When the charge on the transistor electrode 30 is dissipated, the molecules 50 located in line between the transistor electrode 30 and the common electrode are in staircase formation and a white pixel is formed on the display screen.

Using the transistor electrode matrix, and the generation of white or black pixels through the rotation of polarized light in LC layer, images composed of pixels can be formed on the flat panel screen 24. It should be noted that although many layers are required to form the image, some are structural and some are circuitry, the viewer of angle 38, views the image as optically within the LC layer. The image forms optically within the position of the LC layer 16.

The reasons for the problems mentioned previously regarding conventional flat panel LC displays can now be discussed. Because the resultant pixel image is optically formed within the LC layer 16, and not within the outer analyzer layer 22, the image is viewed through at least four layers: the LC layer 16, the common electrode 18, the glass support 20 and the analyzer 22. In color flat panel LCDs, the color filter layer 40 may represent a fifth layer. Often many conventional LC displays contain an external transparent layer of silicon dioxide about (0.5-1.0) mm thick resting on top of the analyzer layer for protection. In this case, the image is viewed through at least five layers. The difference between the image position and the surface of the flat panel display is called the "image depth." Large image depth contributes to the problem of parallax. The larger the image depth the worse the parallax. For instance, when the flat panel screens are viewed off axis (direction 39), the optical position of the image is different from the tangible position on the screen surface. The apparent position of the pixel is not the same as the position on the surface of the screen vertically correspondent with the electrode grid below responsible for creating the apparent image. This is true because the screen tilt and image depth forces the image to appear in a screen location which is not directly above the image and thus difficult to touch when using thick touch sensitive screens and is therefore difficult to target when the display is used in a touch sensitive configuration.

This problem is particularly acute when a touch sensitive screen is used in a computer system where the user of the system provides inputs to the system by pointing to (and hence touching) objects displayed on the screen. The image depth is enlarged when touch sensitive flat panel touch screens are employed because a special thick touch sensitive layer rests on top of the analyzer representing a possible sixth layer. The obvious answer to this problem is to make the layers, through which the image must pass, sufficiently thin to reduce the image depth. However, structural support is required to protect the fragile LC layer 16 (mechanical pressure on the LC layer can modify the alignment of the LC molecules of the structure and can even permanently damage the LC structure) and hence a sufficient thickness of at least layer 20 is required. It has been found that threshold thickness values thick enough to protect the LC layer also create parallax problems. Another suggestion to reduce the image depth in the past has been to remove the glass layer 20 and place the analyzer 22 on top of the common electrode layer 18. However, this does not operate effectively because the analyzer (and polarizer) are plastic. They therefore do not generally survive the process of applying metallization (the conductive layers which make up the electrode grid and the common electrode). More importantly is the problem of the necessary precision with which the gap in the LC material must be maintained. Plastic films, which polarizers are not made with the process herein, do not have the dimensional stability to be used as a top glass, bottom glass, or for any of the structural elements required in LCD manufacture.

In one prior art touch screen configuration a conductive layer is placed on a glass plate which is added on top of the LCD structure to sense the position of a finger or pen. This conductive layer cannot be reliably applied to a plastic layer, hence the requirement for an additional glass layer, which adds to the parallax problem. The invention herein could be used to remedy the problems associated with the before described touch screen configuration as the conductive layer could be applied directly to the glass plate of the invention to be described later. This would alleviate all parallax problems and simplify the construction of the display.

The present invention solves this parallax problem by providing a new layer structure which effectively brings the resultant image up to the outer surface of the new screen display. Therefore, no parallax problems remain because the image depth approaches zero. The new multilayer structure also provides adequate protection to the LC layer.

A second issue is the use of resistive sheet touch screen technology on top of a prior art LCD. Current LCD manufacture requires that an additional glass layer be applied over the completed LCD, above the analyzer layer, on which a moderately conductive (100–500 $\Omega$/square) transparent layer is applied in a similar fashion and of similar characteristics to the common electrode. This layer is used in conjunction with appropriate sensing technology to locate the position of a finger or other conductive object which is in electrical contact at some point with the conductive surface of the touch screen. The requirements of the substrate of such a screen are similar to the requirements of the top glass in that the substrate must withstand the heat of processing required to apply the conductive layer, and that instead of the primacy of dimensional stability in importance, wear resistance is important. Plastic, as is commonly well understood is far less wear resistant than glass, and as such attempts at plastic substrate touch screens do not survive use. For these reasons the structure of a resistive sheet sensing technology LCD assembly cannot be simplified in prior art by placing the conductive layer required for sensing on the analyzer layer, as it is made of plastic. The current invention could be advantageously used in such an assembly by applying the conductive layer required for sensing directly to the front surface of the fiber-optic faceplate, which is glass. Appropriate sensing technology is, for example, manufactured by Micro Touch Systems, Inc., 55 Jonspin Road, Wilmington, Mass. 01887, 508-1694-9900, Fax 508 694-9980.

Another problem with LCDs, particularly super-twist and double super-twist passive matrix displays, to which the herein described invention could equally be applied, is contrast aberrations evident at off-primary-axis viewing angles, indicated as 39. It can be appreciated that the polarization properties of the LC material are determined by their physical alignment to the polarizer and analyzer layers as well as the viewer. It can also be clearly appreciated that when the viewing angle is off-axis, 39, not on-axis, 38, the physical alignment between the various layers and the viewer is changed. This change is manifested in contrast aberrations, frequently so severe at angles greater than a few tens of degrees as to completely invert the image such that those pixels intended to be seen as light appear dark and vice-versa. The problem is particularly apparent in color LCD configurations where the observed color is created by a balance of intensities created by three pixels, one red, one blue, one green. In general the contrast aberrations resulting from off axis viewing are not uniform pixel to pixel and therefore the observed colors in a color LCD very significantly from viewing position to viewing position.

One prior art suggestion has been a layer arrangement that uses a complicated set of (2-4) thin film compensation ($\pm 100$ $\mu$m per film) layers between the analyzer and the top glass in the LCD structure to compensate for the polarization differences resulting when the image rays pass through the LCD structure at various angles to the viewing position. The film compensation layers serve to compensate for variations in the degree of polarization as a function of angle of view. The functional properties of the films used (also known as retardation films) are the birefringence (on the order of 0.004) and the retardation (on the order of 300–500 nm). A description of the physics that underlie the function of the compensation films is beyond the scope of this application; however, the result of the application of retardation films is an increase in the complexity of the LCD structure without fully alleviating contrast problems associated with off-axis viewing.

As seen by FIG. 3, another prior art system attempts to solve the problems associated with off axis viewing by placing a fiber-optic layer 42 on top of the analyzer 22 creating a new structure 25. The physical properties of the fiber-optic layer are such that the image formed within the LC layer is optically resolved onto the surface of the fiber-optic layer. The fiber-optic glass layer 42 contains millions of two ended tiny glass rods standing up on end and fused side by side mechanically together. The rods 48 may be viewed as a collection of fibers or "light tubes." Each light tube is capable of taking an image resolved on one end and optically resolving it at the other end. The image from the LC layer is "pixalated" by these rods when transferred from one rod end to the other thus transferred from the bottom surface of the fiber-optic layer to the top surface. By pixalation it is meant that the details of the underlying image, in this case the image formed in the LC layer, are integrated into each rod. The image data within each rod is scattered such that the rod carries only light of a certain intensity and color. Taken together the rods form an image in much the same way as the LCD itself, but generally on a much smaller scale. Each pixel of the image is transferred by many microscopic fiber-optic glass rods 48. Optically, the image generated in the LC layer appears on the exterior surface of the fiber-optic layer, i.e., as if printed there. The fiber rods, 48, conduct light via an effect known as total internal reflection. Functionally, the rods are small enough that light entering the fibers does so at an angle less than a certain critical angle, known as the Brewster angle, and determined by the ratio of the index of refraction of the core of the fiber and the index of refraction of it's surface or the index of refraction of the medium of it's cladding, if a cladding is used. Once received into the fiber, light bounces from side to side of the fiber. The diameter of the fiber being small enough that the light cannot strike the side of the fiber at an angle greater than some minimum significantly smaller than the brewster angle. As a result the light is transmitted down the fiber by a series of nearly innumerable reflections, each one entirely without loss. It should be noted that since each rod is vertically aligned with the LC layer, it views the LC layer from angle 38. Once the image is transmitted to the surface of the fiber-optic plate, it is viewed with axial dependance of the fiber-optic plate, not the LCD. The off-axis viewing characteristics of fiber-optic materials can be made to be far superior to those of any LCD not using a fiber optic structure.

However, fiber-optic layers have an inherent limitation when used in prior art flat panel LCD screen structures 25. Fiber-optic materials have a very small focal length, on the order of a few hundreds of an inch in most cases. The apparent image floats within the LC layer, 16, and since the thickness of the various required layers between the LC layer, 16, and the fiber-optic layer, 42, is typically greater than the focal distance of the fibers, the result is an entirely unfocused image, generally utterly illegible.

There have been several suggestions in the prior art to reduce the thickness of intervening layers, however they are inadequate as described as follows. In an effort to reduce image depth, the fiber-optic layer 42 cannot be placed directly above the common electrode 18 because the analyzer 22 is required (above the LC layer) to polarize the light. Also, a structural support glass 20 is recommended to protect and support the LCD structure. This glass layer 20 (above the LC layer) and analyzer layer 22 add to the image depth and thus add to the focus problem. In prior art, the analyzer layer, 22, is manufactured from PET [poly-ethylene-trichloride], and so neither the common layer, 18, nor the color filter layer, 40, can be applied to it as processing temperatures required are too high, also, the dimensional stability of PET is too low to maintain the working gap distance required in the LC layer, 16. It has also been suggested to place the fiber-optic layer 42 beneath the analyzer 22 to rid the problems of parallax and off axis contrast degradation. However, the fiber-optic layer will scatter the light polarization which was carefully generated by the LC layer 16 as the light passes through the fiber-optic layer 42. Once scattered, the image will never form even if it passes through the analyzer 22.

The present invention eliminates off axis viewing problems by allowing the image to form at the exterior surface of layers of a new flat panel display structure. Since the image is viewed on the surface of the new exterior layer, no off axis viewing problems result. A specially designed layer is advantageously utilized by the present invention which replaces three layers: the top glass layer 20; analyzer layer 22; and fiber-optic layer 42.

Another problem with the conventional structure of prior art LCDs is the general requirement that the analyzer layer, 22, be the top most layer. As this layer is, in prior art, manufactured from PET, it is relatively soft and therefore subject to damage and wear from normal use. As a solution to this problem in those cases where necessary, such as portable computers, the analyzer layer, 22, is covered with a coating of $SiO_2$ (silicon dioxide), which is very hard, to minimize the risk of accidental damage. This process adds to the complexity and expense of finished product. Another solution is to add yet another glass layer above the completed sandwich to protect the fragile analyzer. This solution also adds to the complexity and cost of manufacture as well as adding to the weight of the assembly.

Another problem of conventional flat panel displays is their multiple layer structure. This tends to be very expensive and difficult to construct. The present invention effectively eliminates the need for: (1) the top glass layer 20; (2) the analyzer layer 22; (3) the fiber-optic top layer 42; and (4) any silicon dioxide protective layer. In replacement thereof the present invention utilizes a single polarizing fiber-optic layer.

It is therefore an object of the present invention to create a new and improved flat panel display utilizing liquid crystal technology that solves the off axis contrast problems and color aberrations associated with off axis viewing. It is another object of the present invention to create a flat panel display that eliminates the parallax problem that becomes a major problem in touch screen applications. It is another object of the present invention to reduce the number of layers required to fabricate a conventional LC display and thus reduce the end product fabrication costs, and assembly weight.

SUMMARY OF THE INVENTION

A faceplate apparatus for use in a flat panel screen display for displaying images such as a liquid crystal display, the flat panel screen display having a flat panel multilayer structure, the faceplate apparatus comprising: a mechanically uniform and optically coherent fiber-optic layer for polarizing visible light there through from the flat panel multilayer structure so as to allow the formation of images within the flat panel multilayer structure, the fiber-optic layer also for optically resolving the images up from the flat panel multilayer structure to the optical surface of the fiber-optic layer so as to reduce problems of parallax and off axis viewing distortion such as contrast aberration; the fiber-optic layer comprising a plurality of stacked and adhered glass elements, each of the glass elements having a width, a thickness and an arbitrary length; the thickness of each of the glass elements being so small as to restrict a predetermined wavelength range of light from passage there through; the width of each of the glass elements being large enough to allow the predetermined wavelength range of light to pass there through so that the polarization of the fiber-optic layer is in the direction of the width; the length of each of the glass elements large enough so as to allow tangible layers of fiber-optic material to be cut therefrom.

The invention further includes a computer system having such a flat panel display.

BRIEF DESCRIPTION OF THE DRAWINGS

FIG. 5(A) illustrates a perspective view of a single glass plate laminae used in the polarizing fiber-optic layer of the present invention.

FIG. 5(B) illustrates a method of bundling, drawing and thereby reducing the glass plate laminae in fabricating the polarizing fiber-optic layer of the present invention.

DETAILED DESCRIPTION OF THE PREFERRED EMBODIMENT

The present invention includes a specially designed polarizing fiber-optic layer and the resulting multilayer screen structure using the polarizing fiber-optic layer for a flat panel LCD screen. The new LCD screen contains all the benefits of the prior art display screens and, in addition, many more advantages stemming from the new polarizing fiber-optic layer. The present invention offers an LC display screen having an image quality comparable to that of black ink on high quality paper. In the following description numerous specific details are set forth in order to provide a thorough understanding of the present invention. However, it will be obvious to one skilled in the art that the present invention may be practiced without these specific details. In other instances well known methods have not been described in detail as not to unnecessarily obscure the present invention.

Figure 4:
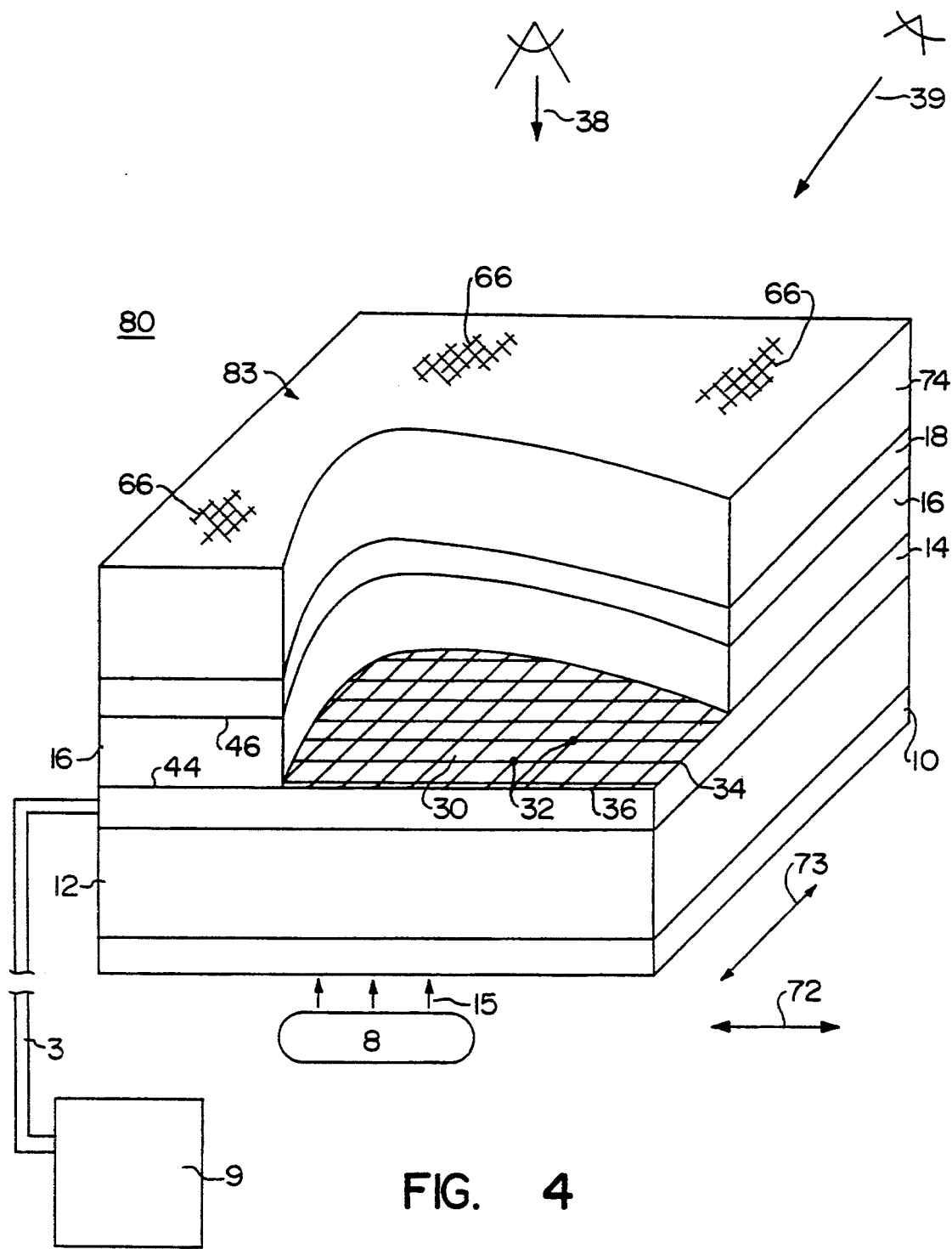
FIG. 4 illustrates the present invention as a liquid crystal multilayer structure for a flat panel display.

The preferred embodiment of the present invention is shown in FIG. 4. The present invention is a new multilayer structure for a flat panel LCD screen 80. The new structure 80 reduces the number of layers required for fabrication of the screen while at the same time eliminating the parallax and contrast problems caused by off axis viewing. The new structure 80 contains a new layer 74 not previously described which replaces several of the other layers shown in the prior art structures 24 and 25. These layers are more fully discussed in the paragraphs to follow. Briefly, only one layer of top-glass is required for the present invention (along with common electrode layer 18), no film compensation layers are required and no additional polarizing layers are present.

Specifically, layer 74 is a specially designed and fabricated glass material that has BOTH the properties of a fiber-optic and the properties of a polarizer and is therefore referred to as a polarizing fiber-optic layer; as shown in FIG. 4, layer 74 of structure 80 replaces the following layers of structure 25: the analyzer layer 22, the top glass layer 20, and the fiber-optic layer 42. Operating as a fiber-optic material, layer 74 brings the LCD image up from the LC layer of the present invention to the top surface of layer 74. It is appreciated that the fibers view the image at a constant angle of sight of 90 degrees (view 38) so they present on the fiber-optic surface a constant 90 degree view of the image. This 90 degree view is realized by the user even when layer 74 is viewed by off axis angles.

Referring still the FIG. 4, the preferred embodiment of the present invention will now be more fully described. Starting from the most interior layer, a standard unpolarized light source 8 emits output light radiation 15 from behind the screen plane to substantially irradiate the entire screen back plane. This is referred to "back lighting." However, it should be appreciated that other forms of lighting may work equally as effectively. These back lit light rays traverse through a first polarizer layer 10 (approximately 1 mm thick) which polarizes the light in a first direction 73 referred to as the zero (0) degree. The light next travels though a bottom glass layer 12 (approximately 1.1 mm thick) which is transparent and does not effect the polarization character of the first polarized light. The glass layer 12 is used mainly to provide mechanical support for the LCD structure. The glass structure layer and the first polarizer layer are mechanically secured together.

Figure 1:
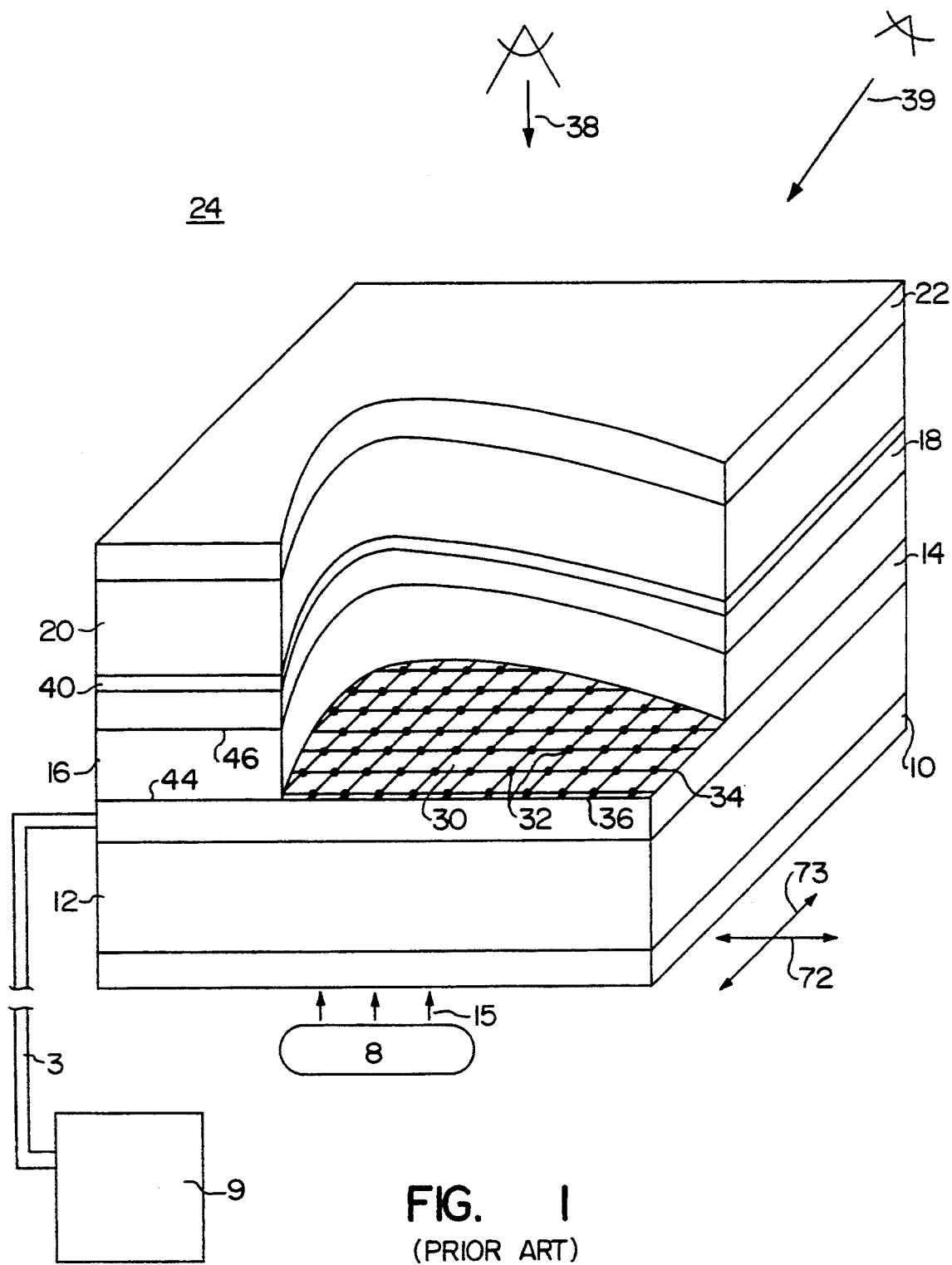
FIG. 1 illustrates a prior art liquid crystal display structure containing multilayers with a cross section removed to illustrate the components.
Figure 2A:
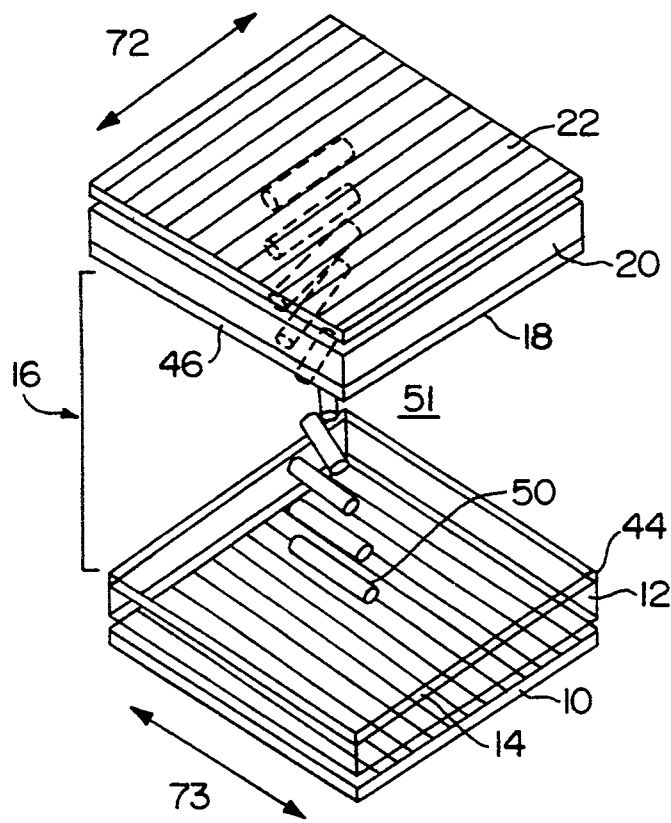
FIG. 2(A) illustrates the liquid crystal material showing the prior art crystal molecule staircase arrangement when no electric field is applied.
Figure 2B:
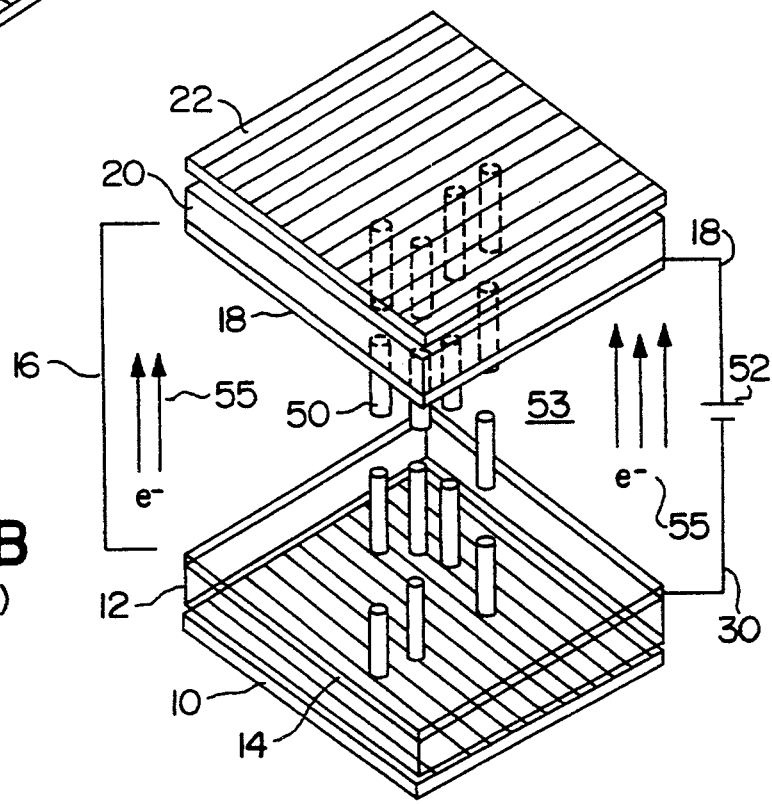
FIG. 2(B) illustrates the liquid crystal material showing the prior art crystal molecule vertical alignment upon application of an electrical field.
Figure 2C:
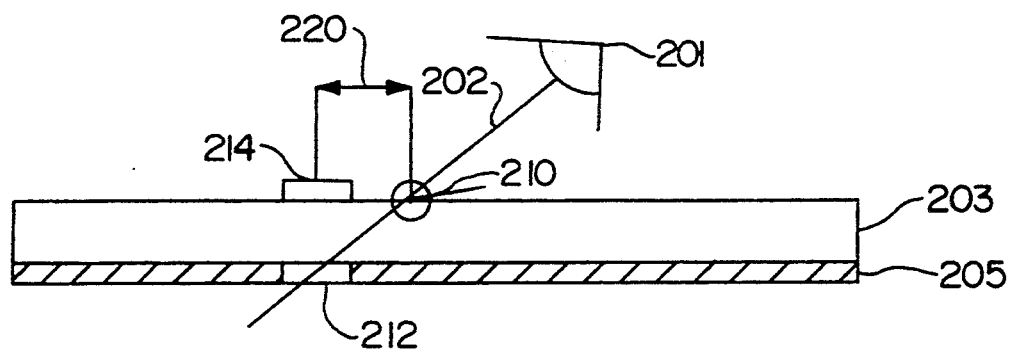
FIG. 2(C) is an illustration of the common parallax problem associated with touch screen environments.
Figure 8:
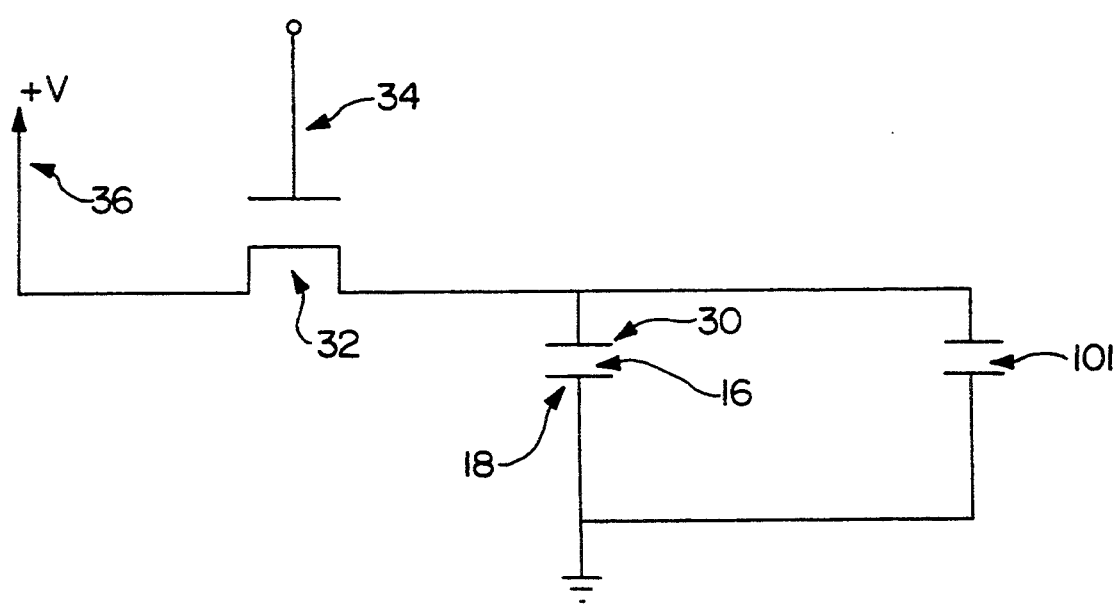
FIG. 8 illustrates a schematic of a single cell of the transistor electrode matrix layer of the present invention.
Figure 3:
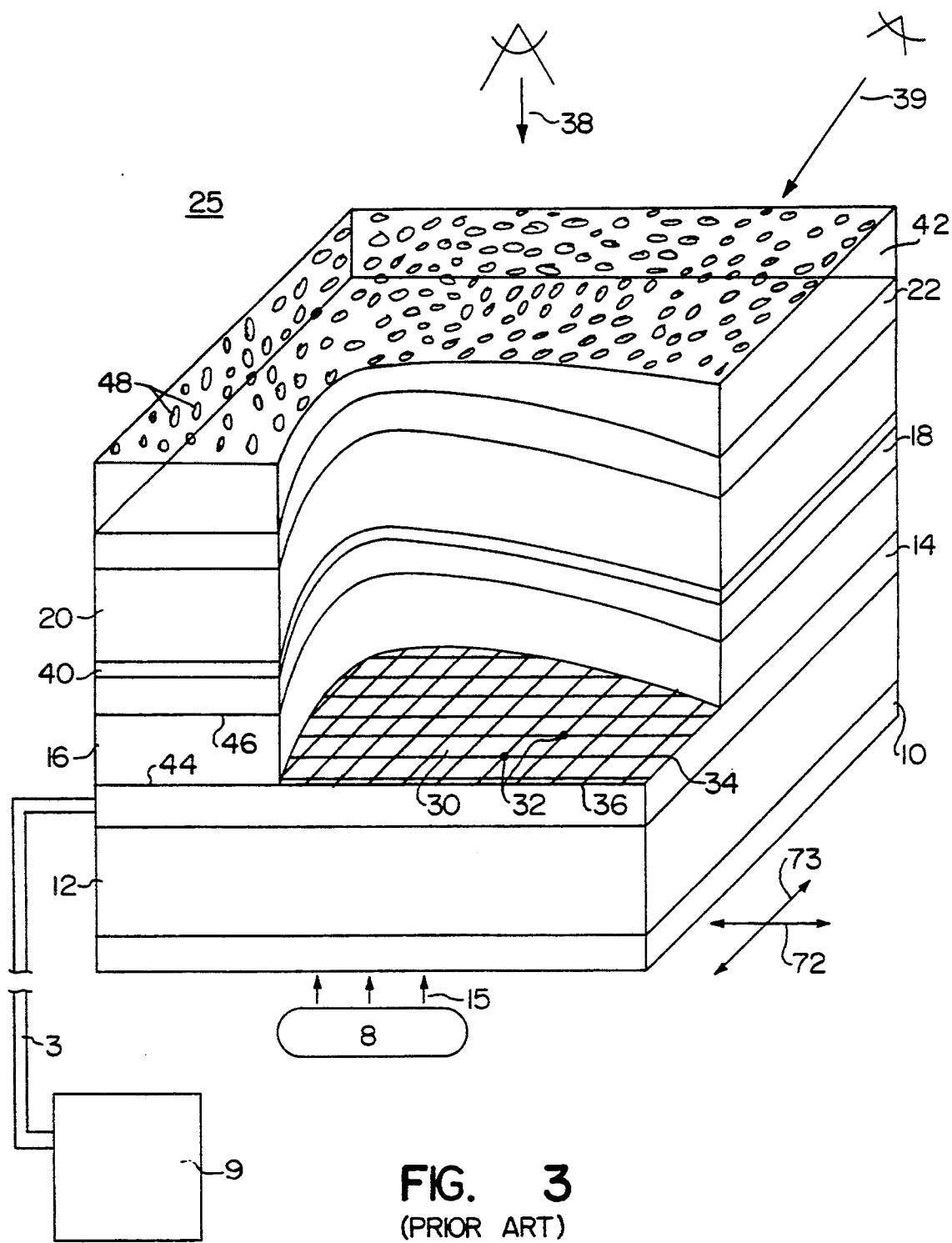
FIG. 3 illustrates a prior art liquid crystal display structure utilizing an exterior fiber-optic layer.

Referring still to FIG. 4, in the present invention, the light traverses through a transistor and transparent output electrode matrix layer 14 (approximately 50–60 nm thick) which provides the control required to form images. The type of layer utilized in this control layer is an active matrix layer. All images created by this flat panel LCD are composed of pixels, or "dots." Each pixel has a corresponding transistor from the control layer 14. In other words, each transistor is responsible to create a viewable "pixel" on the viewing screen. A matrix of such transistors may thus be used to create an image. Each transistor is not transparent but their associated electrode 30 is composed of a transparent material, indium tin oxide, and are conductors. The transistors are shown in the cut away cross section of layer 14 and are illustrated by the dark dots 32 at each intersection line. The lines represent the control lines for the transistors; the drain lines are illustrated by lines 36 running vertically and the gate lines are illustrated by lines 34 running horizontally. To activate a particular transistor 32, its identifying gate lines 34 and drain lines 36 are activated. Each transistor 32 also has a corresponding output electrode 30 associated with it which will charge up upon transistor activation. See FIG. 8, which represents the electrical equivalent of one cell within the transistor electrode matrix which generates one pixel element for display. Not all of the output electrodes are shown in FIG. 4 for simplification. Only a few electrodes 30 are shown and shaded, however, it is appreciated that each transistor has its own output electrode. The electrode is connected to either the drain or the source of the transistor depending on where the voltage source is connected to the transistor. According to the preferred embodiment, a voltage can be applied to the source of each transistor and each electrode is therefore connected to the drain of the corresponding transistor. When the transistor is "on" the electrode 30 is charged to the voltage, 36, set by the display driver circuitry, 9. A holding capacitor 101 maintains this charged state and the charge is maintained until re-connected to the voltage source, 36, by the transistor, which may be at a different voltage at this time, as determined by the computer, 9.

Figure 9:
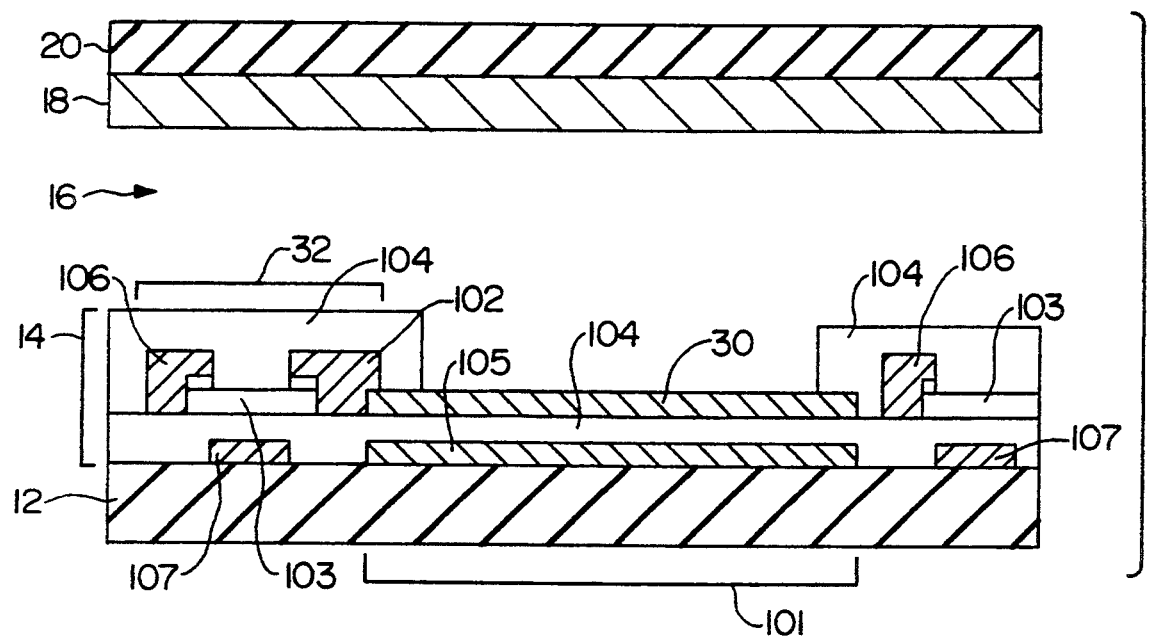
FIG. 9 illustrates a structural diagram of a thin film transistor, the attached transparent electrode, and a portion of a neighboring transistor within the context of an LC display.

FIG. 9 illustrates the structure of a typical thin film transistor (TFT) as commonly used in the manufacture of active matrix LC displays (known in the industry as am-LCDs). FIG. 9 illustrates the structure of the TFT, 14, and the storage capacitor, 101, as well as the surrounding structure, as described below. At the top of the figure is illustrated the top glass, 20, under which is applied, typically via sputtering, the common electrode, 18, which is made of indium tin oxide, or ITO, a transparent metal. Above the aforementioned structure is usually applied the analyzer, 22, not in this illustration, which is adhered to the top of glass with an optically coupling adhesive. Beneath the ITO layer, 18, is applied the upper lacquer alignment layer, not illustrated. Sandwiched within the structure is the liquid crystal, or LC, layer, 16. The spacing of this layer is usually maintained via small glass balls or glass fibers of the appropriate diameter. Directly underneath the LC layer, 16, is the bottom lacquer layer, also not illustrated. Two TFTs are illustrated, one fully and one partially. The fully illustrated TFT, 32, is comprised of many layers. Topmost is the passivation layer, 104, made of silicon dioxide, $SiO_2$. Vertically below are the source and drain metallizations, 106 and 102 respectively. These are connected electrically to the source lines, 36, and the transparent electrode, 30, respectively. The gate itself, 103, is controlled by the metallization, 107, which is connected electrically to the gate line, 34. A storage capacitor, 101, is formed by the underlayment of an ITO layer, 105, beneath the passivation, 104, and is connected electrically to ground. The structure is built on a glass substrate, 12, generally made of a temperature stable glass, such as Corning 7059. Underneath the bottom glass, 12, is applied the polarizer, 10, also not illustrated.

In the present invention, the computer sets the voltage levels of the electrode plates, 30, a row at a time by first turning on the gate line, 34, corresponding to the row of pixels in question. Then the computer sets various voltage levels for various pixels to achieve results desired as described below. The voltage levels set are generally 0 and 2.2 volts to achieve results of dark and light pixels via the process described below, but are not necessarily limited to binary representations and may take on intermediate values as are used in gray scale displays. All voltage levels for the row of pixels must be set simultaneously and individually. The voltage applied thusly, to the source, 106, of the transistor, via the source bus, 36, are carried through to the drain, 102, through the gate, 103, opened by the application of voltage. The various voltages applied to the columns of pixels via the computer at this time are also applied equally, column by column, to the sources of all rows of pixels in the display, however, to no row, but to the row in question is the gate voltage applied and therefore the gates of all rows are closed and the voltage is not transmitted to the drain of the other rows of transistors not connected to gate line 34. Connected to the drain of the transistor, 102, is a capacitor, 101, which is charged to the voltage being applied to the column of pixels by the computer, and holds this charge after the gate, 103, is rendered non-conductive via the grounding of the gate line, 34. The voltage maintained on the capacitor, 101, is realized as a localized electrical field between the electrode plate, 30, and the common electrode, 18. The electrical field effects the liquid crystal layer, 16, in a manner described herein.

Refer to FIG. 4. The first polarized light, after passing through the control layer 14, passes through the the liquid crystal layer 16 (approximately 4–10 μm thick). This is a liquid layer which holds the crystal molecules within in a suspension environment. The liquid must be secured on the sides of the layer structure by an epoxy or other material, not shown, or else it would flow out from the sides. On the bottom side 44 of the liquid crystal layer 16, lacquer velvet etching create very fine parallel markings in an arbitrary but unidirectional fashion. On the top side 46 of the liquid crystal layer 16, different lacquer velvet etchings create similar fine parallel markings perpendicular to the marking on side 44. These markings will be used to mechanically hold the LC molecules in place.

In the present invention, the light passes through the liquid
crystal layer to the next layer which is the common electrode layer 18 (approximately 50–60 nm thick). This layer creates a reference voltage for use with each of the independent output electrodes 30. This common electrode is also transparent and made of a similar material as that of the output electrode 30. The liquid crystal layer 16 is mechanically coupled to, and sandwiched between, both the control layer 14 and the common electrode layer 18.

In the preferred embodiment of the present invention, the interaction between the LC layer 16, the common electrode layer 18 and the transistor control layer 14 is the same as that disclosed in the prior art and is a well known phenomena. Therefore, it is not repeated in detail herein. In short, when an electric field 55 is applied across the LC layer, the LC molecules align vertically and will not rotate polarized light; a dark pixel results. With no field present, the LC molecules align in a spiral staircase fashion which rotates the polarized light from one polarized direction 73 to another, 90 degrees different 72; a light pixel results. The transistors 32 and output electrodes 30 control the existence of the electric field. The computer 9, is connected to the transistor active matrix through connection bus 3 and through this couple the computer 9 controls the transistor matrix which creates the images.

From this point on the preferred embodiment of the present invention radically departs from the prior art structures 24 or 25. Instead of using a separate analyzer 22 layer for polarization, a separate top glass 20 for support, and a separate fiber-optic material layer 42 to reduce off axis viewing problems, the present invention advantageously uses one material that is both polarizing and fiber-optic. This material, layer 74 called a polarizing fiber-optic, also provides good structural support for the LC layer and therefore may be substituted for the top glass layer 20. Since the polarizing fiber-optic layer, 42, has the same mechanical characteristics of the glass from which it is made, its dimensional stability is therefore the same as the top glass, and may be safely and practically used in its stead unlike the soft plastic polarizer layer.

The method of fabrication of the polarizing fiber-optic layer 74 will be described later. What follows is a continuation of the operational description of the polarizing fiber-optic layer within the inventive flat panel structure 80. Refer to FIG. 4. As was discussed, light passes through the LC layer 16 and its direction of polarization is either rotated or not, depending on the localized electric fields within the LC layer through which the light rays pass. The light then passes through the transparent common electrode layer 18. The common electrode layer 18 is structurally coupled to the polarizing fiber-optic layer 74; this layer 74 is approximately 2–4 mm thick. The polarizing fiber-optic layer is specially manufactured such that it polarizes light in a second direction 72 which is perpendicular to the direction of polarization 73 of the first polarizing layer 10. Therefore, first polarized light whose polarization angle is not rotated by the LC layer will not pass through layer 74. Thus, polarizing fiber-optic layer 74 acts as the analyzer layer 22 of structure 25 and is used to form the resultant image polarization. Rotated light in the LC layer 16 passes through layer 74 as a white "pixel" and light not rotated by LC layer 16 is blocked by layer 74 and appears as a dark "pixel."

In addition to a polarizer, layer 74 is also a fiber-optic layer. As shown, fibers 66 make up layer 74 and are not rods but stacked plates. Only a small representation of plates 66 is shown in FIG. 4, however, it should be appreciated that the entire polarizing fiber-optic layer 74 is composed of these stacked plates 66. As a fiber-optic material, layer 74 optically brings the image formed in the LC layer 16 to its outer surface 83. Therefore, the image produced by the flat panel LCD screen is optically perceived as existing on surface 83 of layer 74; the image has no image depth. Optically to the user, the image is viewed no different than if it had been printed on the surface of layer 74 with a pen or pencil. This is the case because each glass plate 66, acts as an individual light "tube" bringing the image up from the LC layer 16, on one end of the tube, to the surface of layer 74, the other end of the tube. Vast amounts of microscopic plates optically raise the entire image from the LC layer 16 to the surface of layer 74. Each plate is aligned vertically against the LC layer 16 and views the image from view angle 38. According to the nature of fiber-optic material, each glass plate creates a resultant display on the surface 83 of the polarizing fiber-optic layer 74 as if viewed from angle 38, even if viewed by an angle such as view 39.

Since the polarizing fiber-optic layer 74 is a glass material, it acts as an insulator. Therefore, it may be properly placed on top of the common electrode layer 18. Also, since layer 74 is a glass material is offers excellent structural support for the LC layer 16. Due to these properties, layer 74 replaces the top glass layer 20 of structure 25 which provided support and insulation.

It can be appreciated that the preferred embodiment of the present invention utilizes the polarizing fiber-optic material 74 to advantageously perform the functions of the three layers of structure 25, namely the top glass 20, the analyzer 22, and fiber-optic 42 layers. By eliminating these layers, the multifunctional layer 75 dramatically reduces the costs of manufacturing the resultant flat panel LCD screen. Layer 74 also solves the problems of contrast aberrations and parallax which are caused by off axis viewing. These solutions will be further discussed below.

It is appreciated that there are many obvious alternate methods of arriving at cross (double) polarization for dark pixels and alike polarization for light pixels. For instance, the first polarizing layer 10 and the polarizing fiber-optic layer 74 could be aligned such that they both polarize light in the same direction, i.e. both in 73 direction or both in 72 direction. Therefore, only light polarization NOT rotated in the LC layer 16 would pass through to the observer 38, and that light rotated by the LC layer 16 would not pass through creating a dark pixel. The electric field would therefore represent a light pixel, not a dark pixel. Or alternatively, the first polarizer 10 could polarize in the 72 direction while the polarizing fiber-optic layer could cross polarize in the 73 direction. It would be obvious to make such a transformation.

According to the preferred embodiment, the LC image forms within the LC layer through the interaction of the bottom polarizer, the LC layer 16 and the polarizing fiber-optic layer. This LC image is then optically resolved to the surface of the polarizing fiber-optic layer 16 through the properties of this layer 74. Therefore, the resultant (viewed) image is actually observed on the surface of the polarizing fiber-optic layer 16 and not within the LC layer 16. Previous prior art fiber-optic layers, such as layer 42, suffered because of the large image depth of the resultant image formed in the LC layer 16. The layer 74 of the present invention also has a shallow focal depth, however, because it is multifunctional, it replaces many of the layers that caused the image depth of the prior art structure to be so large. As shown in FIG. 4, the polarizing fiber-optic layer 74 rests directly on top of the super thin common electrode layer 18 (approximately 50-60 nm thick). Since the image forms in the LC layer 16, directly underneath layer 18, the image depth is merely a few microns, which is well with the focal length of fiber-optic material (a few thousands of an inch). It is appreciated that the reason layer 74 can rest on the common electrode layer 18 is because it is a polarizer which replaced the analyzer layer 22, it offers structural support to replace the top glass layer.

Therefore, there is no parallax problems because the resultant image formed by the present invention will always be viewed optically at a physical position on the screen surface and not deep within the LC layer 16. This is true even if the flat panel LCD screen is at a large tilt as illustrated by off axis viewing angle 39. Since the image is produced as existing on the surface of layer 74, the image will be perceived as if viewed through a fiber-optic faceplate at all angles. This means that the angular viewing dependencies are those of the fiber optic faceplate, which are highly advantageous to those of the LCD. The image of the LCD is viewed by the fiber-optic polarizer always from angle 38 regardless of the orientation of the display relative to the viewer. Parallax problems are eliminated by the nature of having the apparent image at the surface of the display.

Also, there are no contrast problems nor color aberrations because the image is resolved at the surface of layer 74. Again, the contrast problems and color aberrations associated with viewing a prior art LCD at an angle other than 38 are solved advantageously by the use of the herein described fiber-optic polarizer which itself always views the LCD from the optical angle, 38, regardless of from which angle the observer views the fiber-optic faceplate. The off-axis aberrations are caused because the process of polarization is inherently dependent on the angle of alignment between all elements, including the viewer. In the case of the present invention, the viewer is the fiber-optic polarizer. The fiber-optic polarizer "views" the LCD (of which it is part) always from angle 38, regardless of the orientation of the display to the observer, who sees the virtual image resolved on the surface of the fiber-optic polarizer. All image light rays travel from the surface of layer 74. Since the image is perceived as if viewed straight on by view 38, even from off axis views the image contrast is always constant and excellent. For similar reasons, no color aberrations result.

It can be appreciated, that the preferred embodiment, structure 80, of the present invention offers several excellent advantages over the prior art structures 24 and 25. Although the cost of manufacture of the fiber-optic polarizer may be higher than the cost of manufacture of any single component, due to the number of steps required as described later, this cost is amply offset as the fiber-optic polarizer replaces multiple discrete layers in prior art LCD manufacture. Also, because the preferred embodiment of the current invention utilizes some of the structure found in the flat panel display of structure 25, modification of existing systems to fabricate the present invention can be readily realized. Further, no parallax problems exist, so touch screen flat panel displays may be accurately and efficiently utilized. No contrast degradation (including contrast inversion) or color aberrations exist as a function of viewing angles, so the resultant flat panel LC displays provide crisp, dark and clear images when viewed from all angles.

All of these advantages have been realized by replacing several layers of the old structure 25 with a new, multifunctional, polarizing fiber-optic layer 74.

The detailed construction and composition of fiber-optic layer 74 and associated glass plates 66 will now be explained. It should be noted that nonessential details relating to the fabrication process of fiber-optic layer 42 are disclosed in the manufacturing materials documents from Incom Corporation, Inc. located at 294 Southbridge Road, Charlton, Mass., 01507. Note that the above reference discloses the manufacture of an ordinary fiber-optic material composed of rods and not composed of new glass plates as is advantageously used in the present invention to provide polarization. However, the manufacture of ordinary fiber-optic materials composed of rods is sufficiently similar to that of glass plate manufacture that such reference acts as a beneficial source of background material.

Figure 10A:
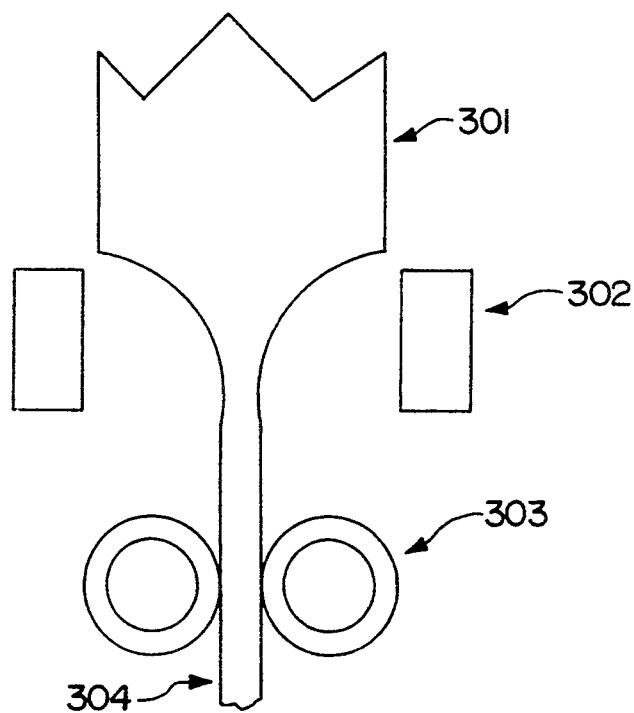
FIG. 10(A) and 10(B) illustrate portions of the process used to create the polarizing fiber-optic faceplate.

Refer to FIG. 10(A). The process by which conventional fiber-optic faceplates are generally manufactured will now be described. Alterations to the process as required to manufacture the present invention will be described later, but they do not replace the basic fabrication process. The manufacture of fiber-optic faceplates starts with rods of glass of a desired alloy approximately 5 cm across and approximately 1 meter long and either square or hexagonal in cross section. These dimensions are not determined by physics, but rather by practical manufacturing constraints. The glass rods 301 are drawn through a carefully controlled furnace, 302, by a pair of pinch rollers 303 at a carefully controlled rate. By monitoring the rate of draw and the temperature of the furnace, the rods 301 are drawn from approximately 5 cm in width to rods 304 approximately 2.5 mm in width. The initial cross sectional shape of the rod 301 is preserved throughout the process such that rod 304 is of the same cross sectional shape as 301 only smaller. The rod 304 is mechanically broken into segments approximately 1 meter long as it is drawn through the furnace.

Figure 10B:
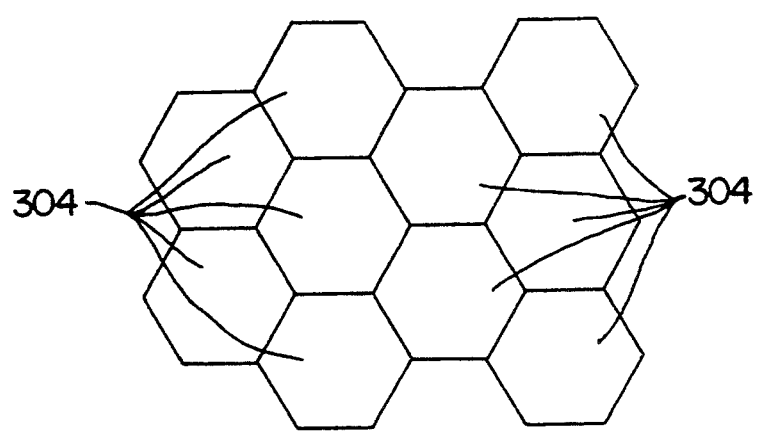

Once a large number of rods 304 have been drawn and broken to length, they are stacked into a bundle as illustrated in FIG. 10(B), which shows a small cross section of the bundle of rods which would actually contain approximately 400 rods arranged into a bundle of approximately the same width and length as the original rod. This bundle is drawn through the furnace in a similar manner as the original rod, and, like the original rod, is reduced in width by a factor of approximately 20. The process of heating the bundle and drawing it cases the rods to fuse mechanically together as a solid piece of glass; this causes the rods to adhere to each other. Optically, however, the integrity of each rod remains intact. Following the second draw, the diameter of each original rod of glass has been reduced to approximately 125 $\mu$m, the diameter of the bundle has been reduced to approximately 2.5 mm. The bundle is mechanically broken as it is drawn from the furnace into approximately 5 cm in width and 1 meter long. This super-bundle is drawn through the furnace as before and, as the rods were fused, so are the bundles mechanically but not optically fused together. The super-bundle is made up of approximately 160,000 individual rods, each of which has been drawn through the furnace three times and is now approximately 6.25 $\mu$m in diameter. The overall super-bundle is approximately 2.5 mm in width, and exhibits the properties of a fiber optic material in that light is conducted along the length of each rod of glass and does not leak through the sides of the glass because each glass rod is so thin that once light enters the rod at one end it cannot strike the sides of the rod at more acute than a very shallow angle which is less than the brewster angle, defined as the angle at which light, when striking the interface between two medium with different indices of refraction, is totally reflected. It is via this effect that a ray of light which enters one end of a rod of glass smaller than a certain critical diameter, which is larger than the diameter to which these rods have been drawn, is transmitted from one end of the fiber to the other with negligible loss.

The super-bundle is made up of approximately 160,000 such fibers each of which is capable of transmitting a ray of light from one end of the super-bundle to the other. As the rods are stacked in such a way that the matrix order remains constant over the length of the super-bundle, an image incident on one end of the super-bundle will be resolved coherently at the order. In the manufacture of fiber-optic faceplates, the super-bundles are broken into short lengths of approximately 50 cm and these are again stacked, but this time into a "log" of cross sectional area approximately the same as is desired in height and width in the final faceplate. This "log" is pressed in a high temperature hydraulic press and mechanically, but not optically fused together. The fused log is then sliced across it's width into plates which conduct a coherent image through their thickness. The process of manufacture described is identical to the preferred method of manufacture of the invention with the changes to be described below. For example, such fiber-optic faceplates are manufactured by the above described process by Incom, Inc. 294 Southbridge Road, Charlton, Mass. 01507, (508)765-9151.

Refer to FIG. 5. Element 66 represents a starting material glass plate. This plate will eventually be drawn down in dimensions. The present embodiment of the invention utilizes a vast amount of these drawn glass plates stacked together in bundles and mechanically fused to create the polarizing fiber-optic layer 74. The polarizing fiber-optic layer 74 is mechanically uniform, that is each drawn glass plate is fused with others to create a continuous glass structure without holes or pockets. The layer is also optically coherent, meaning that it will transmit an entire image from one side to the other without distortion or aberrations because the fiber-optic layer 74 is mechanically uniform. However, layer 74 is not optically uniform, that is, the material displays optical anisotropy in that it is manufactured out of millions of "light pipes" oriented along the thickness of the plate each one of which will transmit light from one end to the other, but allows negligible leakage between "light pipes".

A single starting glass plate 66 is shown in FIG. 5(A). The preferred embodiment of the invention utilizes a glass plate 66 having a width 62 of 5 cm (about 2 inches), an arbitrary length 64 of about 100 cm, and a very thin thickness 60 of 0.05 cm (about 0.02 inches). These plates are herein called lamina. The lamina 66 are highly oblique plates having an aspect ratio of about 100:1. According to the method of fabrication, the laminae 66 are stacked as shown by FIG. 5(b) one on top of the other to form a primary bundle 75 which is 2×2 inches by an arbitrary length of 100 cm. Since the lamina width 62 is already two inches, roughly 100 lamina are stacked thickness wise 100 high to create the 2×2 bundle 75 (i.e., 0.02 inches stacked 100 high is 2 inches). For simplicity, the FIG. 5(B) shows only 8 laminae. The primary bundle 75 is then extruded through furnace heating elements 68 in the direction shown by 76, as described above for conventional manufacture of fiber-optic faceplates. The result is a drawn and fused primary bundle 77 wherein each starting lamina 66 is "drawn" thinner in the width dimension 62 and thickness dimension 60 while enlarging the length dimension 64 creating a drawn lamina 66a. The resultant drawn laminae 66a are each mechanically, but not optically, fused together into the drawn primary bundle 77. The drawn primary bundle 77 has been drawn down (or reduced) to about 1/20 of its original width and thickness. The thickness of each lamina has been dramatically reduced from 0.02 inches to roughly 0.001 inch thick by the first draw.

By the following drawing process, the drawn glass plates eventually become polarizers of visible light. The drawn primary bundles 77, are then stacked again like the original plates 66 into a secondary bundle 2 inches high and drawn again to form secondary drawn bundles which have been reduced by a factor of 20 again; these are not shown. This process of drawing and stacking bundles is repeated until the width of each drawn lamina has been reduced to approximately 6.25 microns and the thickness of each drawn lamina is approximately 0.064 microns. With these dimensions, single mode light transmission is supported across the width of the glass laminae, as is currently realized by prior fiber-optic faceplates. However, as the wavelength of blue light is approximately 0.35 microns, no light transmission is supported across the thickness of the lamina being only 0.064 microns. The drawn laminae are now ready to be used to create the fiber-optic layer 74.

Therefore the starting laminae are fabricated at such dimensions so that when drawn they act as both a microscopic fiber-optic element and as a polarizer of visible light; they polarize light in the direction of their width when arranged in a fashion allowing the incident light to travel through along their length.

Figure 6:
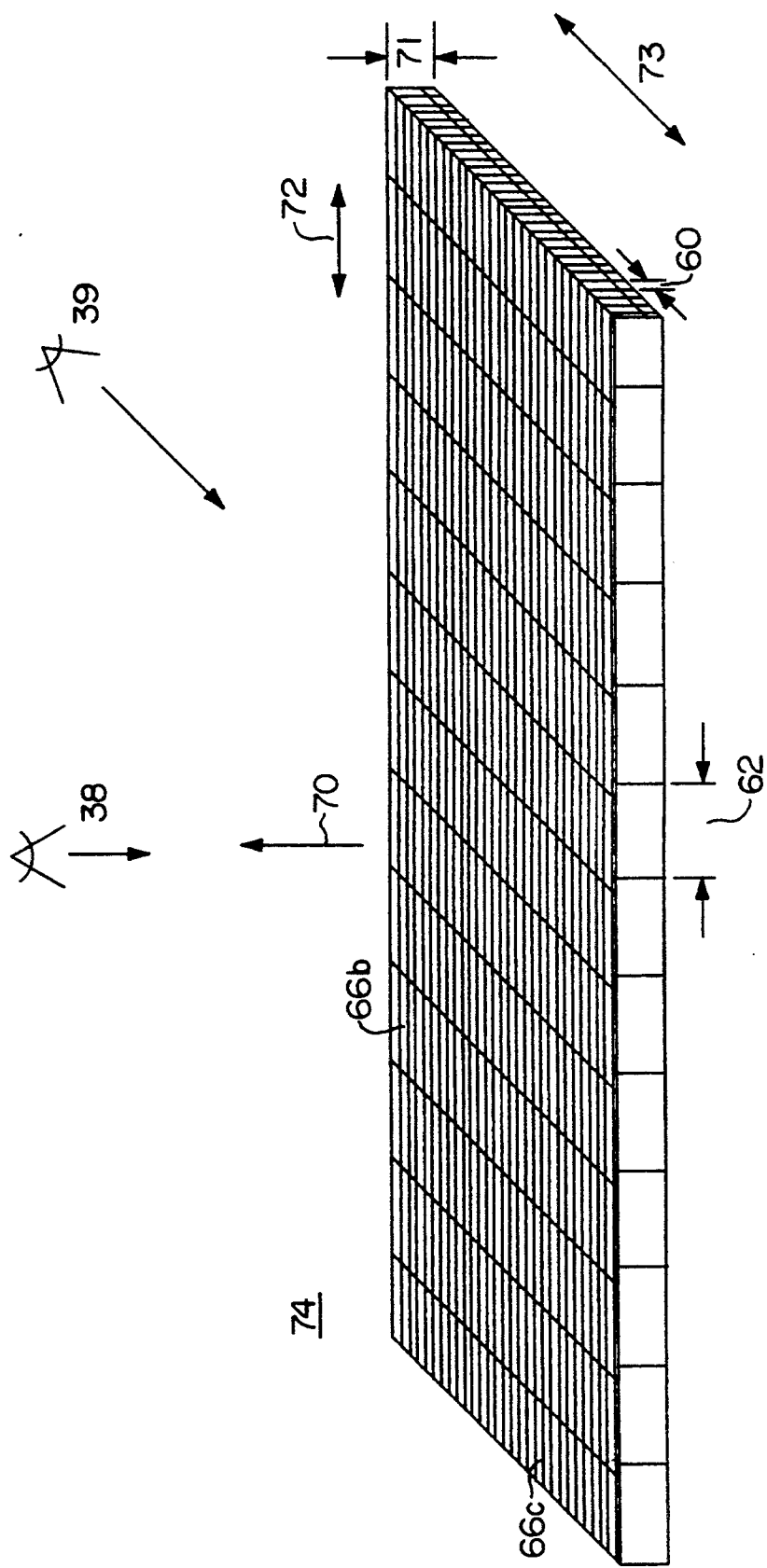
FIG. 6 illustrates the layer of the polarizing fiber-optic material after cut for placement on the liquid crystal structure of the present invention.

Refer to FIG. 6. The finally drawn bundles are then stacked together lengthwise by row and column and specially heated and pressed to make a mechanical seal; the resultant stack is called a "log" (not shown) having the approximate final dimensions of the faceplate desired. The bundles are mechanically, but not optically fused using a heat and pressure process. The length of the log is arbitrary and corresponds roughly to the length of the finally drawn bundles but the other dimensions of the log should be large enough to cover the opening of the flat panel LCD screen. The log is then sliced perpendicular to its length, using either a diamond edge band saw or an I.D. wafer saw, and ground flat and polished to form a thin layer 74 about 3 mm thick 71. Thickness 71 of layer 74 represents only one slice of the log so many layers can be produced from the same log. This layer 74 is the polarizing fiber-optic layer because the drawn glass elements that form the fiber-optic nature of the layer have been fabricated to such a dimensions that each also acts as a light polarizer. FIG. 6 illustrates a representational amount of the drawn, stacked and sliced glass plates at 66b and 66c.

FIG. 6 also illustrates how the bundles are arranged and pressed together to form the polarizing fiber-optic layer 74. As can be seen the width 62 has been drawn to 6.5 microns and the thickness, 60, has been drawn to 0.064 microns which will not support visible light passage in a direction which is coincident with the thickness 60. This layer shown 74 is the same layer as shown in FIG. 4 and will be placed on top of the common electrode layer 18 to form the inventive flat panel LCD screen structure 80. Refer still to FIG. 6. Of course, the actual layer to cover a typical screen would be composed of many more drawn microscopic glass plates, but only a representative number are illustrated for clarity. The direction of light travel is shown by arrow 70. The direction of light polarization in the width direction is shown by arrows 72. When the microscopic drawn laminae are arranged in this format they do not allow light passage diagonally through the layer because of the plate element structure, that is the layer is mechanically but not optically uniform.

Referring to FIG. 6, since layer 74 polarizes light in the 72 direction, any light traveling from the flat panel LCD screen structure 80 and polarized in the 73 direction will not pass through polarizing fiber-optic layer 74. Light polarized by the first polarizing layer 10 is polarized in the 73 direction. Therefore, unless the light's polarization is rotated in the LC layer 16, it will not pass through the polarizing fiber-optic layer 74. Also, the polarizing fiber-optic layer 74 "pixolates" the image of the LC layer, as does any fiber-optic material. Underneath layer 74 (within the LC layer 16) there can be a combination of colors, images or intensities under each individual lamina and they are all averaged together when brought up to the surface of layer 74. That average intensity of color and image contrast is brought through the fibers and seen on the surface of layer 74. However, there is never a resolution issue regarding the pixolation of the polarizing fiber-optic material because for each LC pixel created by a transistor, there are associated with it at least 300,000 optical fibers 66b, 66c bringing the LC pixel to the surface of layer 74. The top of the faceplate may be protected by a diamond coating, and the tope of the faceplate may be given a fine polished texture to avoid glare.

Figure 7:
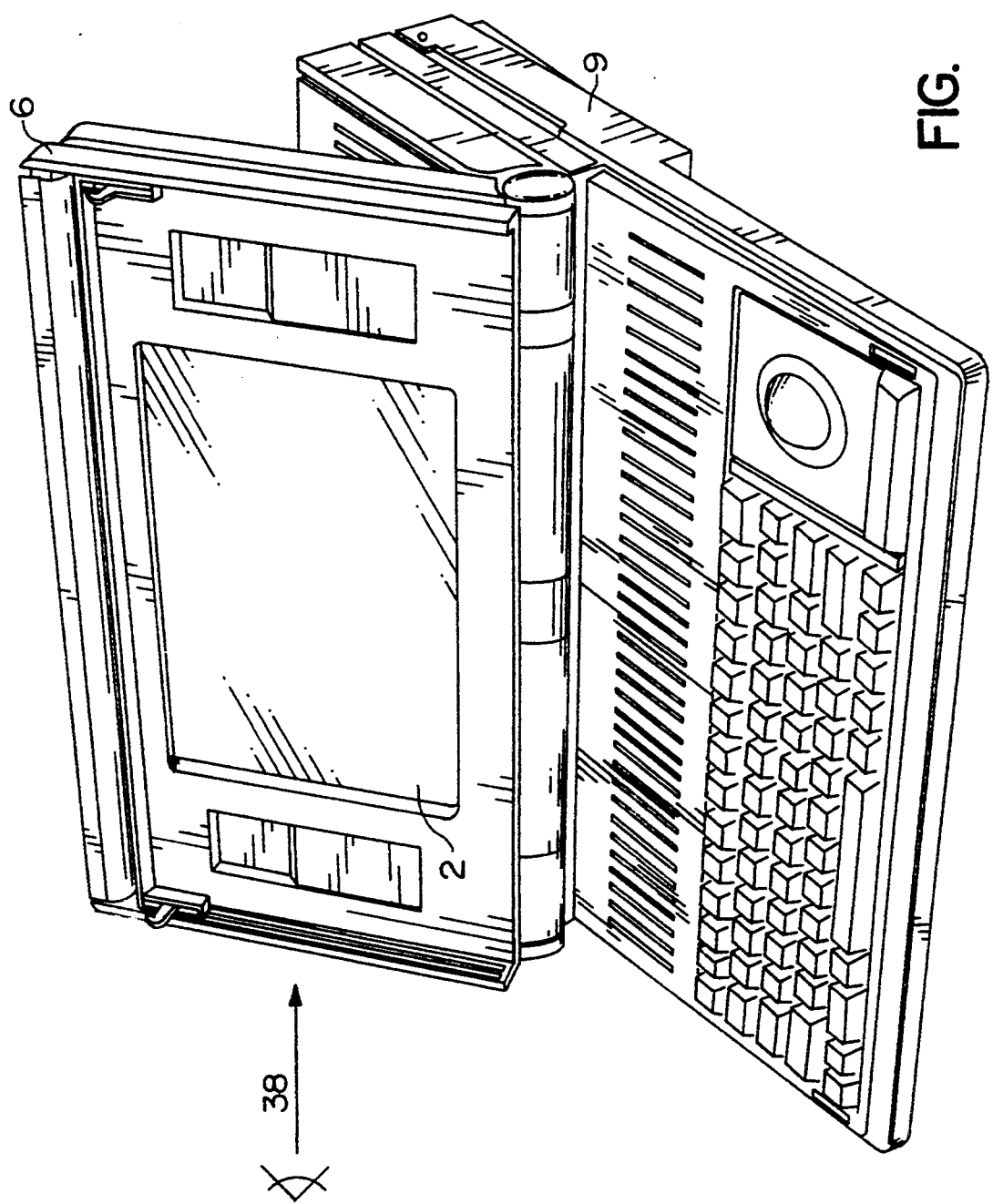
FIG. 7 illustrates a portable computer showing the flat panel display screen of the present invention.

FIG. 7 illustrates the preferred embodiment of the present invention installed within a Macintosh portable computer 9 from Apple Computer Inc. of Cupertino, Calif. which includes a conventional central processing means such as a 68000 microprocessor from Motorola. The full layer of the flat panel LCD screen structure 80 is large enough to cover the screen 2, about 8.5 by 5.5 inches. The multilayer structure 80 is placed with a movable screen assembly 6 when closes over the keyboard shown. The computer unit 9 controls the creation of images through a physical connection 3 (not shown) to the flat panel screen structure 80. The straight on angle of view is shown by reference direction 38. Using the present invention polarizing fiber-optic layer 74 within the novel flat panel LCD screen structure 80, the Macintosh portable computer enjoys crisp contrast and colors at any angle of view as well as a reduced cost of manufacture. With application of a touch screen no image position parallax problems will be present and screen selections can be accomplished easily and accurately.

Herein a new and improved flat panel LCD screen structure has been described utilizing a new polarizing fiber-optic layer having several important advantages over other conventional LCDs multilayer structures.

What is claimed is:

1. A faceplate apparatus for use in a flat panel screen display for displaying images, said flat panel screen display having a flat panel multilayer structure, said flat panel multilayer structure having a liquid crystal layer, said faceplate apparatus comprising:

polarizing fiber-optic layer means for polarizing visible light from said flat panel multilayer structure, said polarizing fiber-optic layer means also for optically transferring said images up from said liquid crystal layer to the optical surface of said polarizing fiber-optic layer means;

i) wherein said polarizing fiber-optic layer means comprises a plurality of structural elements mechanically uniformly joined, each of said structural elements having a width, a thickness and an arbitrary length;

ii) wherein said thickness of said each of said structural elements is so small as to restrict a predetermined wavelength range of visible light from passage them through;

iii) wherein said width of said each of said structural elements is large enough to allow said predetermined wavelength range of visible light to pass there through so that said polarization of said polarizing fiber-optic layer means is in a direction of said width; and iv) wherein said length of said each of said structural elements is large enough so as to allow tangible layers of said layer means to be cut therefrom.

2. A faceplate apparatus for use in a flat panel screen display for displaying images as described in claim 1 wherein said polarizing fiber-optic layer means is a fiber-optic layer material that provides for light polarization there through, said fiber-optic layer material being mechanically uniform and optically coherent and wherein each of said structural elements is a glass plate structure.

3. A faceplate apparatus for use in a flat panel screen display for displaying images, said flat panel screen display having a flat panel multilayer structure, said faceplate apparatus comprising:

mechanically uniform and optically coherent polarizing fiber-optic layer for polarizing visible light them through from said flat panel multilayer structure so as to allow the formation of images within said flat panel multilayer structure, said polarizing fiber-optic layer also for optically resolving said images up from an interior portion of said flat panel multilayer structure to the optical surface of said fiber-optic layer;

i) wherein said polarizing fiber-optic layer comprises a plurality of stacked and adhered glass elements, each of said glass elements having a width, a thickness and an arbitrary length;

ii) wherein said thickness of said each of said glass elements is so small as to restrict a predetermined wavelength range of light from passage there through;

iii) wherein said width of said each of said glass elements is large enough to allow said predetermined wavelength range of light to pass there through so that said polarizing of said polarizing fiber-optic layer is in a direction of said width; and iv) wherein said length of said each of said glass elements is large enough so as to allow tangible layers of polarizing fiber-optic material to be cut therefrom.

4. A faceplate apparatus for use in a flat panel screen display as described in claim 3 wherein said predetermined wavelength range of light is within the visible spectrum.

5. A faceplate apparatus for use in a flat panel screen display as described in claim 4 wherein said glass elements are thin glass plates stacked adjacently and mechanically fused together by heat and or pressure.

6. A faceplate apparatus for use in a flat panel screen display as described in claim 5 wherein said thickness of said glass plate is approximately 0.064 microns.

7. A faceplate apparatus for use in a flat panel screen display as described in claim 5 wherein said width of said glass plate is approximately 6.0 to 10.0 microns.

8. A faceplate apparatus for use in a flat panel screen display as described in claim 5 wherein said length of said glass plate is large enough so that layers may be cut therefrom of approximately 1.0 to 2.0 centimeters.

9. A flat panel screen display for displaying images composed of pixels, said flat panel screen display comprising:

a) light emitting means for emitting and or reflecting incident light radiation;

b) first polarizing means situated to receive said light radiation and to polarize said light radiation in a first polarizing direction thus transmitting first polarized radiation c) first transparent supporting means for providing support for said screen display and situated to receive and transmit there through said first polarized radiation, said first transparent supporting means coupled to said first polarizing means;

d) transparent electric field generating means for generating localized electric fields and for transmitting said first polarized radiation, comprised of a plurality of localized output electric field electrodes, said transparent electric field generating means coupled to said first transparent supporting means;

e) polarity altering layer comprised of a plurality of localized and discrete areas selectively altering said first polarized radiation, each of said areas having a first state and a second state wherein said first state alters the polarity of said first polarized radiation and wherein said second state does not alter the polarity of said first polarized radiation, said polarity altering layer coupled to said transparent electric field generating means, said polarity altering layer for generating said pixels that form said image;

f) common electrode means for providing a reference electrode for each of said plurality of localized output electric field electrodes such that each of said plurality of localized electric fields is in the direction of said common electrode, said common electrode coupled to said polarity altering layer such that said each of said plurality of localized electric fields traverse through said polarity altering layer; and g) polarizing fiber-optic means having an outer surface exposed for holding and viewing said image composed of pixels, said polarizing fiber-optic means for polarizing said altered first polarized radiation and for optically resolving said pixels which appear in said polarity altering layer up to the outer surface of said polarizing fiber-optic means, said polarized fiber-optic means polarizing said altered first polarized radiation in a second polarizing direction 90 degrees to that of said first polarizing direction, said polarizing fiber-optic means coupled to said common electrode means, wherein said polarizing fiber-optic means is comprised of a thin layer of glass material, said thin layer of glass material comprising a plurality of stacked and adhered glass plates, each of said glass plates having a width, a thickness and an arbitrary length;

i) said thickness of said each of said glass plates is so small as to restrict a predetermined wavelength range of light from passage there through;

ii) said width of said each of said glass plates is large enough to allow said predetermined wavelength range of light to pass there through so that said polarization of said fiber-optic layer is in the direction of said width;

iii) said length of said each of said glass plates being large enough so as to allow tangible layers of fiber-optic material to be cut therefrom.

10. A flat panel screen display for displaying images as described by claim 9 wherein said glass plates of said polarizing fiber-optic layer act as a visible radiation polarizer in the direction of the width of said glass plates, such that visible radiation may pass through the width of said glass plate, but not through the thickness of said glass plate.

11. In a flat panel screen display for displaying images having a flat panel multilayer structure composed of a light emission device, a first polarizing layer for polarizing said light, a first glass supporting layer coupled to said first polarizing layer, a transistor and electrode matrix layer for generating electric fields coupled to said first glass supporting layer, a liquid crystal layer for selectively altering the polarization of said polarized light, said liquid crystal layer coupled to said transistor and electrode matrix, and a common electrode layer which, with the transistor and electrode layer, sandwiches the liquid crystal layer, within said flat panel screen display the improvement comprising:

mechanically uniform and optically coherent fiber-optic layer for polarizing visible light there through from said flat panel multilayer structure, said fiber-optic layer also for optically resolving said images up from an interior portion of said flat panel multilayer structure to the optical surface of said fiber-optic layer;
    i) said fiber-optic layer comprising a plurality of stacked and adhered glass elements, each of said glass elements having a width, a thickness and an arbitrary length;
    ii) said thickness of said each of said glass elements is so small as to restrict a predetermined wavelength range of light from passage there through;
    iii) said width of said each of said glass elements is large enough to allow said predetermined wavelength range of light to pass there through so that said polarization of said fiber-optic layer is in the direction of said width;
    iv) said length of said each of said glass elements being large enough so as to allow tangible layers of fiber-optic material to be cut therefrom.

12. An improvement of a faceplate apparatus for use in a flat panel screen display as described in claim 11 wherein
    said predetermined wavelength range of light is within the visible spectrum and
    said images appearing on said optical surface of said polarizing fiber-optic layer, when viewed from off axis angles, still appear as if viewed from a straight angle.

13. An improvement of a faceplate apparatus for use in a flat panel screen display as described in claim 12 wherein said glass elements are thin glass plates stacked adjacently and mechanically fused together by heat.

14. An improvement of a faceplate apparatus for use in a flat panel screen display as described in claim 13 wherein said thickness of each of said glass plates is approximately 0.064 microns.

15. An improvement of a faceplate apparatus for use in a flat panel screen display as described in claim 13 wherein said width of each of said glass plates is approximately 6.0 to 10.0 microns.

16. An improvement of a faceplate apparatus for use in a flat panel screen display as described in claim 13 wherein said length of each of said glass plates is large enough so that layers may be cut therefrom of approximately 1.0 to 2.0 centimeters.

17. A computer system comprising:
    a) central processing means for computing; and
    b) flat panel screen display means for displaying images thereon, said flat panel screen display means communicatively coupled to said central processing means, said flat panel displays means comprising;
    i) a flat panel multilayer structure comprising a light emission device, a first polarizing layer for polarizing said light, a first glass supporting layer coupled to said first polarizing layer, a transistor and electrode matrix layer for generating electric fields coupled to said first glass supporting layer, a liquid crystal layer for selectively altering the polarization of said polarized light, said liquid crystal layer coupled to said transistor and electrode matrix, and a common electrode layer which, with the transistor and electrode layer, sandwiches the liquid crystal layer and allows said electric fields to be generated through said liquid crystal layer; and
    ii) mechanically uniform and optically coherent fiber-optic layer for polarizing visible light there through from said flat panel multilayer structure so as to allow the formation of images within said flat panel screening display means, said fiber-optic layer also for optically resolving said images from an interior portion of said flat panel multilayer structure to the optical surface of said fiber-optic layer;
    wherein said fiber-optic layer comprises a plurality of stacked and adhered glass elements, each of said glass elements having a width, a thickness and an arbitrary length;
    wherein said thickness of said each of said glass elements, is so small as to restrict a predetermined wavelength range of visible light from passage there through;
    wherein said width of said each of said glass elements is large enough to allow said predetermined wavelength range of visible light to pass there through so that said polarization of said fiber-optic layer is in the direction of said width; and
    wherein said length of said each of said glass elements is large enough so as to allow tangible layers of fiber-optic material to be cut therefrom.

18. A method of reducing the problems of parallax and off axis viewing distortion such as contrast aberrations by using a faceplate apparatus for use in a flat panel screen display, said display having a multilayer screen structure, said structure having a liquid crystal layer, said method comprising the steps of:
    a) providing a mechanically uniform and optically coherent polarizing fiber-optic layer that provides for polarization;
    wherein said polarizing fiber-optic layer comprises a plurality of stacked and adhered glass elements, each of said glass elements having a width, a thickness and an arbitrary length;
    wherein said thickness of said glass element is so small as to restrict a predetermined wavelength range of light from passage there through;
    wherein said width of said glass element is large enough to allow said predetermined wavelength range of light to pass there through so that said polarization of said fiber-optic layer is in the direction of said width;
    wherein said length of said glass element is large enough so as to allow tangible layers of fiber-optic material to be cut therefrom;
    b) polarizing visible light which passes from said flat panel multilayer structure through said polarizing fiber-optic layer so as to allow the formation of images within said flat panel multilayer structure; and
    c) optically resolving said images up from said liquid crystal layer to the outer optical surface of said polarizing fiber-optic layer so as to reduce off axis viewing distortion and parallax.

19. A method of reducing the problems of parallax and off axis viewing distortion such as contrast aberrations by using a faceplate apparatus for use in a flat panel screen display as described in claim 18 wherein said predetermined wavelength range of light is within the visible spectrum; and said images resolved up from said liquid crystal layer to the outer optical surface of said polarizing fiberoptic layer, when viewed from off axis angles, still appear as if viewed from a straight on angle.

20. A method of reducing the problems of parallax and off axis viewing distortion such as contrast aberrations by using a faceplate apparatus for use in a flat panel screen display as described in claim 19 wherein said glass elements are thin glass plates mechanically fused together by heat and or pressure.

21. A method of reducing the problems of parallax and off axis viewing distortion such as contrast aberrations by using a faceplate apparatus for use in a flat panel screen display as described in claim 20 wherein said thickness of said glass plate is approximately 0.064 microns.

22. A method of reducing the problems of parallax and off axis viewing distortion such as contrast aberrations by using a faceplate apparatus for use in a flat panel screen display as described in claim 20 wherein said width of said glass plate is approximately 6.0 microns to 10.0 microns.

23. A method of reducing the problems of parallax and off axis viewing distortion such as contrast aberrations by using a faceplate apparatus for use in a flat panel screen display as described in claim 20 wherein said length of said glass plate is large enough so that layers may be cut therefrom of approximately 1.0 to 2.0 centimeters.

24. A method of reducing the problems of parallax and off-axis viewing distortion such as contrast aberrations by using a faceplate apparatus for use in a flat panel screen display as described in claim 20, said method further comprising the steps of placing a layer of conductive and transparent material directly upon said outer optical surface of said flat panel display said conductive and transparent material for sensing a location of a finger or pen in physical contact with said conductive and transparent material.

25. A flat panel display apparatus comprising:

a first polarizing layer disposed to receive light and for polarizing said light in an arbitrary direction;

a polarity altering layer disposed to receive light from said first polarizing layer, said polarity altering layer selectively polarizing or not polarizing portions of said light received from said first polarizing layer in order to generate an image; and a single uniform layer coupled to receive light from said polarity altering layer through a first surface and oriented such that a second surface is presented for visualization, said single uniform layer both polarizing said light received from said polarity altering layer so as to form said image and also optically resolving said image from said polarity altering layer onto said second surface of said single uniform layer to reduce parallax, wherein said single uniform layer comprises a plurality of mechanically fused glass members wherein each member comprises a width oriented along a first axis and a thickness oriented along a second axis and wherein said thickness is of a dimension to restrict light of a predetermined wavelength from passing therethrough in a direction of said first axis and wherein said width is of a dimension to allow said light of said predetermined wavelength to pass therethrough in a direction of said second axis.

26. A flat panel display apparatus as described in claim 25 wherein said plurality of mechanically fused members polarizes light in a direction of said first axis.

27. A flat panel display apparatus as described in claim 25 wherein said plurality of mechanically fused members constitute a fiber-optic layer.

28. A flat panel display apparatus as described in claim 27 wherein said plurality of glass members are arranged in a matrix and wherein each of said glass members resolves a portion of said image from said polarity altering layer to said second surface of said single uniform layer.

29. A flat panel display apparatus as described in claim 25 wherein each of said glass members is approximately 6 to 10 microns in width, approximately 1 to 2 centimeters in length, and approximately 0.64 microns in thickness.

30. A flat panel display apparatus as described in claim 25 wherein said plurality of glass members are arranged in a matrix and wherein each of said glass members resolves a portion of said image from said polarity altering layer to said second surface of said single uniform layer.

* * * * *